US012786947B2

(12) United States Patent
Shreevastav et al.

(10) Patent No.: US 12,786,947 B2
(45) Date of Patent: Nov. 3, 2026

(54) NODE AND METHOD IN A WIRELESS COMMUNICATIONS NETWORK

(71) Applicant: Telefonaktiebolaget LM Ericsson (publ), Stockholm (SE)

(72) Inventors: Ritesh Shreevastav, Upplands Väsby (SE); Henrik Enbuske, Stockholm (SE); Fredrik Gunnarsson, Linköping (SE); Mats Folke, Vällingby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 432 days.

(21) Appl. No.: 18/266,471

(22) PCT Filed: Feb. 8, 2022

(86) PCT No.: PCT/SE2022/050131
§ 371 (c)(1),
(2) Date: Jun. 9, 2023

(87) PCT Pub. No.: WO2022/177489
PCT Pub. Date: Aug. 25, 2022

(65) Prior Publication Data

US 2024/0049169 A1 Feb. 8, 2024

Related U.S. Application Data

(60) Provisional application No. 63/150,601, filed on Feb. 18, 2021.

(51) Int. Cl.
*H04W 64/00* (2009.01)
*H04W 88/06* (2009.01)

(52) U.S. Cl.
CPC .......... *H04W 64/006* (2013.01); *H04W 88/06* (2013.01)

(58) Field of Classification Search
CPC ... H04W 64/006; H04W 88/06; H04W 76/27; H04W 64/00; H04W 24/10; H04W 92/18;
(Continued)

(56) References Cited

U.S. PATENT DOCUMENTS

| | | | | |
|---|---|---|---|---|
| 2018/0146332 A1* | 5/2018 | Opshaug | .................. | G01S 5/10 |
| 2019/0037447 A1* | 1/2019 | Lee | .................. | H04W 74/0833 |

(Continued)

FOREIGN PATENT DOCUMENTS

TW 202014009 A 4/2020

OTHER PUBLICATIONS

3rd Generation Partnership Project; 3rd Generation Partnership Project; Technical Specification Group Radio Access Network; NR; Radio Resource Control (RRC) protocol specification (Release 16), 3GPP TS 38.331 V16.3.1 (Jan. 2021); Technical Specification; pp. 1-932.

(Continued)

*Primary Examiner* — Nimesh Patel
(74) *Attorney, Agent, or Firm* — COATS & BENNETT, PLLC

(57) ABSTRACT

A method performed by a node for handling an upcoming transmission of uplink data between a first User Equipment (UE) and a network node in a wireless communications network is provided. The node obtains (501) one or more criteria relating to characteristics of any one or more out of: A UE and a transmission of uplink data between that UE and the network node. The node obtains (502) characteristics of any one or more out of: the first UE and the upcoming transmission of uplink data for the first UE. The node obtains (503) a determination by determining whether the first UE shall use: (i) inactive mode based Small Data Transmission, SDT, or (ii) connected mode, the for the upcoming transmission of uplink data, based on: The one or more criteria,
(Continued)

and the obtained characteristics of any one or more out of: the first UE and the upcoming transmission of uplink data.

8 Claims, 13 Drawing Sheets

(58) Field of Classification Search
CPC ... H04W 4/029; H04W 64/003; H04W 76/14; H04W 4/02; H04W 4/40; H04W 72/25; H04W 52/0216; H04W 72/12; H04W 88/08; H04W 28/0215; H04W 72/21; H04W 72/20; H04W 36/326; H04W 4/023; H04W 4/027; H04W 52/325; H04W 72/121; H04W 28/0236; H04W 28/0252; H04W 4/06; H04W 4/20; H04W 40/04; H04W 40/20; H04W 40/244; H04W 52/02; H04W 52/0209; H04W 52/0245; H04W 52/146; H04W 52/242; H04W 52/243; H04W 52/327; H04W 56/0005; H04W 56/006; H04W 56/0065; H04W 72/04; H04W 72/52; H04W 74/0816; H04W 74/002; H04W 76/15; H04W 84/042; H04W 4/025; H04W 16/18; H04W 12/63; H04W 36/322; H04W 4/70; H04W 52/0229; H04W 72/563; H04W 72/51; H04W 72/54; H04L 5/001; H04L 5/0007; H04L 5/0012; H04L 5/0044; H04L 1/1861; H04L 1/0026; H04L 1/1887; H04L 12/1407; H04L 5/0023; H04L 5/0005; H04L 5/0057; H04L 25/0254; H04L 25/0224; H04L 25/0212; H04L 27/2601; H04L 27/26035; H04L 41/147; H04L 5/0035; H04L 5/0016; H04L 41/16; H04L 5/0042; H04L 5/0055; H04L 5/0078; H04L 5/0082; H04L 5/1469; H04L 5/22; H04L 43/0864; H04L 9/0637; H04L 1/189; H04L 43/16; H04L 65/80; G01S 5/0236; G01S 13/003; G01S 5/0036; G01S 5/0284; G01S 5/0257; G01S 5/06; G01S 5/02; G01S 5/14; G01S 5/0018; G01S 5/0273; G01S 5/0218; G01S 5/011; G01S 2205/008; G01S 19/46; G01S 13/42; G01S 2013/462; G01S 2205/007; G01S 5/0054; G01S 5/02521; G01S 5/0263; G01S 13/876; G01S 19/42; G01S 5/0063; G01S 1/045; G01S 1/02; G01S 5/0045; G01S 5/0242; G01S 11/06; H04B 17/327; H04B 7/0617; H04B 17/318; H04B 17/328; H04B 7/04013; H04B 7/0408; H04B 7/0632; H04B 7/0695; H04B 17/336; H04B 17/364; H04B 17/255; H04B 17/254; H04B 17/253; H04B 17/27; H04B 17/345; H04B 7/06952; H04B 7/06954; H04B 7/06958; H04B 7/088; H04B 7/18563; H04B 7/18526
See application file for complete search history.

(56) References Cited

U.S. PATENT DOCUMENTS

| | | | | |
|---|---|---|---|---|
| 2020/0053791 | A1* | 2/2020 | Ozturk | H04W 76/11 |
| 2020/0077422 | A1* | 3/2020 | He | H04W 76/27 |
| 2020/0229130 | A1* | 7/2020 | Keating | H04W 52/0229 |
| 2021/0168659 | A1* | 6/2021 | Hong | H04W 28/08 |

OTHER PUBLICATIONS

Ericsson, “Details of CG based SDT”, 3GPP TSG-RAN WG2 #113e, Electronic meeting, Jan. 25-Feb. 5, 2021, pp. 1-5, R2-2101175.
Intel Corporation, “Common User plane aspects for SDT”, 3GPP TSG-RAN WG2 Meeting #113-e, Online, Jan. 25-Feb. 5, 2021, pp. 1-5, R2-2100365.
Oppo, “Discussion on SDT user plane issues”, 3GPP TSG-RAN WG2 Meeting #113 electronic Online, Jan. 25-Feb. 5, 2021, pp. 1-5, R2-2100282.
Samsung, “support of positioning in idle/inactive mode UE”, 3GPP TSG-RAN WG2 Meeting #113e, Online, Jan. 25-Feb. 5, 2021, pp. 1-2, R2-2101908.

* cited by examiner

NODE AND METHOD IN A WIRELESS COMMUNICATIONS NETWORK

TECHNICAL FIELD

Embodiments herein relate to a node and a method therein. In some aspects, they relate to handling an upcoming transmission of uplink data between a first User Equipment (UE) and a network node in a wireless communications network.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Small Data Transmission

Small data solutions have earlier been introduced in LTE with the focus on Machine-Type Communication (MTC). For example, 3GPP Release 15 Early Data Transmission (EDT) and 3GPP Release 16 Preconfigured Uplink Resources (PUR) have been standardized for LTE-Machine to Machine communication (LTE-M) and Narrowband Internet-of-Things (NB-IoT). Unlike these features, the 3GPP Release 17 Small Data for NR is not directly targeting MTC use cases and a Work Item Description (WID) includes smartphone background traffic as the justification.

The Work Item (WI) objectives outline two main objectives: Random Access Channel (RACH)-based schemes and pre-configured Physical Uplink Shared Channel (PUSCH) resources. Comparing to LTE-M and NB-IoT, the 4-step RACH-based scheme is similar to 3GPP Release 15, User Plane (UP)—Early Data Transmission (EDT) and pre-configured PUSCH resources is similar to 3GPP Release 16 UP Preconfigured Uplink Resources (PUR). Further, the 3GPP Release 17, Small Data is only concerning data transmission in INACTIVE state and hence CP-optimizations of EDT and PUR are so far not relevant. 2-step RACH has not been specified for LTE, and hence there is no LTE counterpart for 2-step RACH-based Small Data.

Random Access Procedure in 4-Step RA Type

The 4-step RA type has been used in 4G LTE and is also the baseline for 5G NR. The principle of this procedure in NR is shown in FIG. 1. FIG. 1 a sequence diagram depicting RACH signaling between a UE and a gNB.

Step 1: Preamble Transmission

The UE randomly selects a Random Access (RA) preamble (PREAMBLE_INDEX) corresponding to a selected Synchronization Signals (SS)/Physical Broadcast Channel (PBCH) block. The UE transmits the preamble on the PRACH occasion mapped by the selected SS/PBCH block. When the gNB detects the preamble, it estimates the Timing advance (TA) the UE should use in order to obtain UL synchronization at the gNB.

Step 2: RA Response (RAR)

The gNB sends a RAR including the Timing Advance (TA), the Temporary C (TC)—Radio Network Temporary Identifier (RNTI), a temporary identifier, to be used by the UE, a Random Access Preamble identifier that matches the transmitted PREAMBLE_INDEX and a grant for Message (Msg)3. The UE expects the RAR and thus, monitors PDCCH addressed to Random Access-Radio Network Temporary Identifier (RA-RNTI) to receive the RAR message from the gNB until the configured RAR window (ra-ResponseWindow) has expired or until the RAR has been successfully received.

From 3GPP TS38.321: "The MAC entity may stop ra-ResponseWindow (and hence monitoring for Random Access Response(s)) after successful reception of a Random Access Response containing Random Access Preamble identifiers that matches the transmitted PREAMBLE_INDEX."

Step 3: "Msg3", UE ID or UE-Specific C-RNTI

In Msg3 the UE transmits its identifier (UE ID), or more exactly the initial part of the 5G-Temporary Mobile Subscriber Identity (TMSI) for initial access or if it is already in Radio Resource Control (RRC) connected mode (RRC_CONNECTED) or RRC inactive mode (RRC_INACTIVE) and needs to e.g. re-synchronize, its UE-specific RNTI.

If the gNB cannot decode Msg3 at the granted UL resources, it may send a Downlink Control Indicator (DCI) addressed to TC-RNTI for retransmission of Msg3. Hybrid Automatic Repeat Request (HARQ) retransmission is requested until the UEs restart the random access procedure from step 1 after reaching the maximum number of HARQ retransmissions or until Msg3 can be successfully received by the gNB.

Step 4: "Msg4", Contention Resolution

In Msg4 the gNB responds by acknowledging the UE ID or C-RNTI. The Msg4 gives contention resolution, i.e. only one UE ID or C-RNTI will be sent even if several UEs have used the same preamble, and the same grant for Msg3 transmission, simultaneously.

For Msg4 reception, the UE monitors TC-RNTI if it transmitted its UE ID in Msg3, or C-RNTI if it transmitted its C-RNTI in Msg3.

Random Access Procedure in 2-Step RA Type

The 2-step RA type gives much shorter latency than the ordinary 4-step RA. In the 2-step RA the preamble and a message corresponding to Msg3 (msgA PUSCH) in the 4-step RA can, depending on configuration, be transmitted in two subsequent slots. The msgA PUSCH is sent on a resource dedicated to the specific preamble. This means that both the preamble and the Msg3 face contention but contention resolution in this case means that either both preamble and Msg 3 are sent without collision or both collide. The 2-step RA procedure is depicted in FIG. 2.

Upon successful reception msgA, the gNB will respond with a msgB. The msgB may be either a "successRAR", "fallbackRAR or "Back off". The content of msgB has been agreed as seen below. It is noted in particular that fallbackRAR provides a grant for a Msg3 PUSCH that identifies resources in which the UE should transmit the PUSCH, as well as other information.

Note: The notations "msgA" and "MsgA" are used interchangeably herein to denote message A. Similarly, the notations "msgB" and "MsgB" are used interchangeably herein to denote message B.

The possibility to replace the 4-step message exchange by a 2-step message exchange would lead to reduced RA latency. On the other hand, the 2-step RA will consume more resources since it uses contention-based transmission of the data. This means that the resources that are configured for the data transmission may often be unused. Another difference is that 2-step RA operated without a TA since there is no feedback from gNB on how to adjust the uplink synchronization before the data payload is transmitted in MsgA PUSCH.

If both the 4-step and 2-step RA are configured in a cell on shared PRACH resources, and for the UE, the UE will choose its preamble from one specific set if it wants to do a 4-step RA, and from another set if it wants to do a 2-step RA. Hence a preamble partition is done to distinguish between 4-step and 2-step RA when shared PRACH resources are used. Alternatively, the PRACH configurations are different for the 2-step and 4-step RA procedure, in which case it can be deduced from where the preamble transmission is done if the UE is doing a 2-step or 4-step procedure.

In 3GPP Release 16 2-step RA type procedure, UEs are informed of the potential time-frequency resources where they may transmit MsgA PRACH and MsgA PUSCH via higher layer signaling from the network. PRACH is transmitted in periodically recurring RACH occasions ('ROs'), while PUSCH is transmitted in periodically recurring PUSCH occasions ('POs'). PUSCH occasions are described in MsgA PUSCH configurations provided by higher layer signaling. Each MsgA PUSCH configuration defines a starting time of the PUSCH occasions which is measured from the start of a corresponding RACH occasion. Multiple PUSCH occasions may be multiplexed in time and frequency in a MsgA PUSCH configuration, where POs in an OFDM symbol occupy a given number of PRBs and are adjacent in frequency, and where POs occupy 'L' contiguous OFDM symbols. POs multiplexed in time in a MsgA PUSCH configuration may be separated by a configured gap 'G' symbols long. The start of the first occupied OFDM symbol in a PUSCH slot is indicated via a start and length indicator value ('SLIV'). The MsgA PUSCH configuration may comprise multiple contiguous PUSCH slots, each slot containing the same number of POs. The start of the first PRB relative to the first PRB in a bandwidth part (BWP) is also given by the MsgA PUSCH configuration. Moreover, the modulation and coding scheme (MCS) for MsgA PUSCH is also given by the MsgA PUSCH configuration.

Each PRACH preamble maps to a PUSCH occasion and a DMRS port and/or a DMRS port-scrambling sequence combination according to a procedure given in 3GPP TS 38.213. This mapping allows a gNB to uniquely determine the location of the associated PUSCH in time and frequency as well as the DMRS port and/or scrambling from the preamble selected by the UE.

Small Data Transmission (SDT)

NR supports RRC_INACTIVE state, also referred to as mode, and UEs with infrequent such as periodic and/or aperiodic, data transmission (interchangeably called as small data transmission, or SDT) are generally maintained by the network not in RRC_IDLE but in the RRC_INACTIVE state. Until 3GPP Release 16, the RRC_INACTIVE state doesn't support data transmission. Hence, the UE has to resume the connection, i.e. move to RRC_CONNECTED state, for any DL data reception and UL data transmission. Connection setup and subsequently release to RRC_INACTIVE state happens for each data transmission. This results in unnecessary power consumption and signaling overhead. For this reason, support for UE transmission in RRC_INACTIVE state using random access procedure is introduced in 3GPP Release 17. SDT is a procedure to transmit UL data from UE in RRC_INACTIVE state. SDT is performed with either random access or Configured Grant (CG). The case in which the UE transmits UL data with random access can use both 4-step RA type and 2-step RA type (above). If the UE uses 4-step RA type for SDT procedure, then the UE transmits the UL data in the Msg3. If the UE uses 2-step RA type for SDT procedure, then the UE transmits UL data in the MsgA.

Two types of Configured Grant (CG) UL transmission schemes have been supported in NR since 3GPP Release 15, referred as CG Type1 and CG Type2 in the standard. The major difference between these two types of CG transmission is that for CG Type1, an uplink grant is provided by RRC configuration and activated automatically, while in the case of CG Type2, the uplink grant is provided and activated via L1 signaling, i.e., by an UL DCI with Cyclic Redundancy Check (CRC) scrambled by CS-RNTI. In both cases, the spatial relation used for PUSCH transmission with Configured Grant is indicated by the uplink grant, either provided by the RRC configuration or by an UL DCI.

The CG periodicity is RRC configured, and this is specified in the Configured Grant Configuration Information Element (IE) (ConfiguredGrantConfig IE). Different periodicity values are supported in NR depending on the subcarrier spacing.

For use in SDT, the gNB may configure the UE with Configured Grant type 1 and may also configure Reference Signal Received Power (RSRP) threshold(s) for selection of UL carrier. The configuration is given in the RRCRelease message sent to the UE while in connected state, to move the UE into Inactive state. Or alternatively in another dedicated RRC message, for example while the UE is in RRC_CONNECTED. Alternatively, the configuration is given in the RRCRelease message after a small data transmission procedure where the UE has started the procedure in RRC_INACTIVE and where the UE stays in RRC_INACTIVE after procedure completion. The use of Configured Grant type of resource requires the UE to remain synchronous state in that the time alignment is maintained. Should the UE be out of time alignment, a RA type of procedure can be initiated instead (above).

NR Positioning

Since 3GPP Release 15 and the introduction in NR, the LTE Positioning Protocol (LPP) protocol, which is a point-to-point communication protocol between a Location Management Function (LMF) and a target device, has been agreed to be reused for UE positioning in both NR and LTE (TS 37.355).

At core network, a new logical node called the LMF is the main server responsible for computing the UE position, based on the NR, E-UTRA, or both RATs specific positioning methods. NR Positioning Protocol Annex (NRPPA) is a communication protocol between an NG-RAN and an LMF. The NR Positioning architecture is defined in FIG. 3 according to 3GPP TS 38.305. In FIG. 3:

AMF means Access Mobility Function

SLP means SUPL Location Platform

SUPL means Secure User Plane Location

E-SMLC means Enhanced Serving Mobile Location Centre

NLs means Interface between LMF and AMF

NG-C means Interface between RAN Node and Core Network

TP means Transmission Point

TRP means Transmission Reception Point

NR Uu means NR air interface

LTE Uu means LTE air interface

SET means SUPL Enabled Terminal

New and enhanced positioning methods have been defined in NR 3GPP TS 38.305 such as:

NR Enhanced Cell ID (E-CID);

Multi-Round Trip Time (RTT) Positioning;

Downlink Angle-of-Departure (DL-AoD);

Downlink Time Difference of Arrival (DL-TDOA);

Uplink Time Difference of Arrival (UL-TDOA);

Uplink Angle of Arrival (UL-AoA), including the Azimuth of Arrival (A-AoA) and the Zenith of Arrival (Z-AoA).

3GPP Release 17 Enhancements for Positioning

While keeping the positioning NR architecture and the existing positioning techniques as they have been defined in 3GPP Release 16, one goal of 3GPP Release 17 positioning enhancements is to identify the possible signalling and procedures for improved accuracy, reduced latency, network efficiency, and device efficiency.

In order to meet the requirement of improved accuracy and even reduce latency, it is expected that UE provides rich report to the Network (NW).

Accurate Positioning estimates are subject to UE detecting Line Of Sight (LOS) path and able to provide measurements from the detected LOS path. However, LOS path is not guaranteed, and multi-paths are common. In LTE and NR 3GPP Release 16, a UE reports up to 2 additional multipath. In 3GPP NR Release 17; it is expected that this will be increased.

Rich reporting should also be considered as measurement performed by UE for short duration but providing all the reports to the network. Rich report can help the NW to identify where in cell UE is located geographically by using techniques such as ray tracing, finger-printing, Artificial Intelligence and/or Machine Learning (ML) techniques. The UE does not need to perform the measurement for long interval to only provide nr-Reference Signal Time Difference (RSTD) result. In fact, measurement performed with smaller duration but providing all the necessary results, nr-RSTD plus all additional paths, can help to lower the latency and improve accuracy.

Another aspect that would be discussed is "On demand Positioning Reference Signal (PRS)" where the NW can provide a suitable DL-PRS configuration to UE, for example based upon feedback provided by UE, e.g: Rich Report.

SUMMARY

As a part of developing embodiments herein the inventors identified a problem which first will be discussed.

For positioning applications whether to allow a UE to transmit data via SDT or connected mode has to be taken into considerations. Currently the thresholds that are being discussed are based upon RSRP or Buffer Status Report (BSR).

However, for positioning applications these criteria may not be enough.

An object of embodiments herein is to improve the performance of a wireless communications network using SDT.

According to an aspect of embodiments herein, the object is achieved by a method performed by a node for handling an upcoming transmission of uplink data between a first User Equipment, UE, and a network node in a wireless communications network. The node obtains one or more criteria relating to characteristics of any one or more out of: A UE and a transmission of uplink data between that UE and the network node. The node obtains characteristics of any one or more out of: the first UE and the upcoming transmission of uplink data for the first UE. The node obtains a determination by determining whether the first UE shall use: (i) inactive mode based Small Data Transmission, SDT, or (ii) connected mode, for the upcoming transmission of uplink data, based on the one or more criteria, and the obtained characteristics of any one or more out of: the first UE and the upcoming transmission of uplink data.

According to another aspect of embodiments herein, the object is achieved by a node configured to handle an upcoming transmission of uplink data between a first User Equipment, UE, and a network node in a wireless communications network. The uplink data is adapted to relate to measurement reports of the first UE. The node is further configured to:

obtain one or more criteria, relating to characteristics of any one or more out of: a UE and a transmission of uplink data between that UE and the network node obtain characteristics of any one or more out of: the first UE and the upcoming transmission of uplink data, and obtain a determination or determine whether the first UE shall use: (i) inactive mode based Small Data Transmission, SDT, or (ii) connected mode, for the upcoming transmission of uplink data, based on the one or more criteria, and the obtained characteristics of any one or more out of: The first UE and the upcoming transmission of uplink data.

It is furthermore provided herein a computer program product comprising instructions, which, when executed on at least one processor, cause the at least one processor to carry out any of the methods above, as performed by the apparatus. It is additionally provided herein a computer-readable storage medium, having stored there on a computer program product comprising instructions which, when executed on at least one processor, cause the at least one processor to carry out the method according to any of the methods above, as performed by the apparatus.

Embodiments herein e.g. have at least the following advantages:

They allow the node such as a RAN node or a location server node, to define one or more criteria, e.g. thresholds, triggers or rules, that would facilitate in usage of SDT considering Application type (QoS), UE Power Headroom Reports (PHR), mobility etc. This is an advantage since it ensures efficient resource utilization. The correct decision may be made whether a UE should transit to connected mode or should stay in RRC Inactive state.

Further, they allow a node such as a UE, a RAN node or a location server node, to make a conscious decision on whether to use inactive mode based SDT or connected mode for a transmission. This is an advantage since it allows either UE to save power or for enhanced network resource utilization by making correct decision whether to let a UE use RRC Inactive mode based transmission or connected mode transmission.

BRIEF DESCRIPTION OF THE DRAWINGS

Examples of embodiments herein are described in more detail with reference to attached drawings in which.

DETAILED DESCRIPTION

According to some example embodiments herein, it is provided a method for defining triggers, also referred to as criteria, and thresholds, that would make an optimized decision on whether to allow a UE such as the first UE 121 to use inactive mode or connected mode, e.g. to use inactive mode based SDT or connected mode.

Some of the characteristics, also referred to as techniques, and criteria are briefly mentioned here.

Battery Life (Power)

QoS (Positioning accuracy and/or latency)

Mobility Based

Coverage Indication (normal coverage, poor coverage or extended coverage)

MBS-based

V2X-based

As mentioned above, embodiments herein e.g. have the following advantages:

Allow the node, e.g. in the NW to define thresholds that would facilitate in usage of SDT considering Application type (QoS), UE PHR reports, mobility etc.

Allow a node such as a UE, a RAN node or a location server node, to make a conscious decision on whether to use Inactive mode based SDT or connected mode for a transmission.

Figure 1:
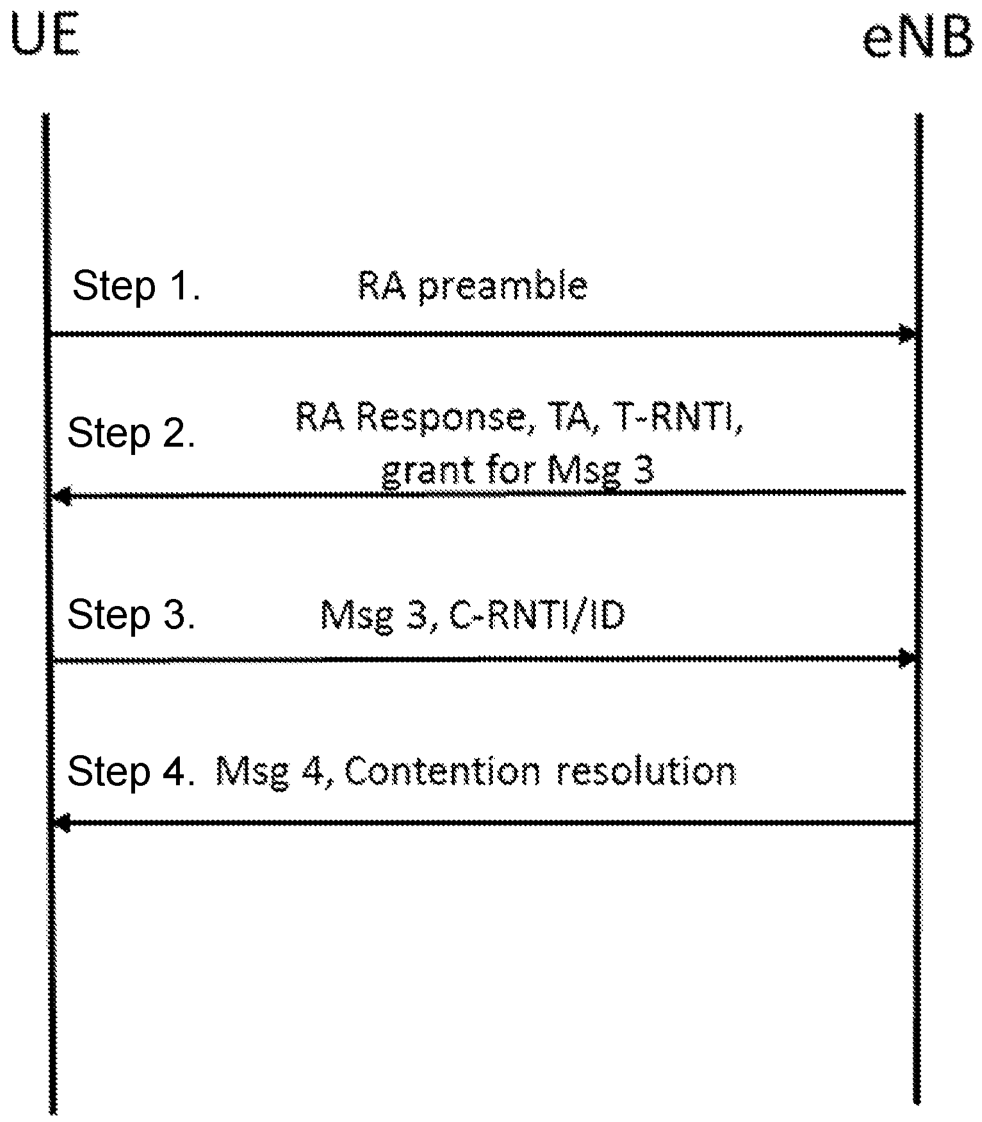
FIG. 1 is a schematic sequence diagram illustrating prior art.
Figure 2:
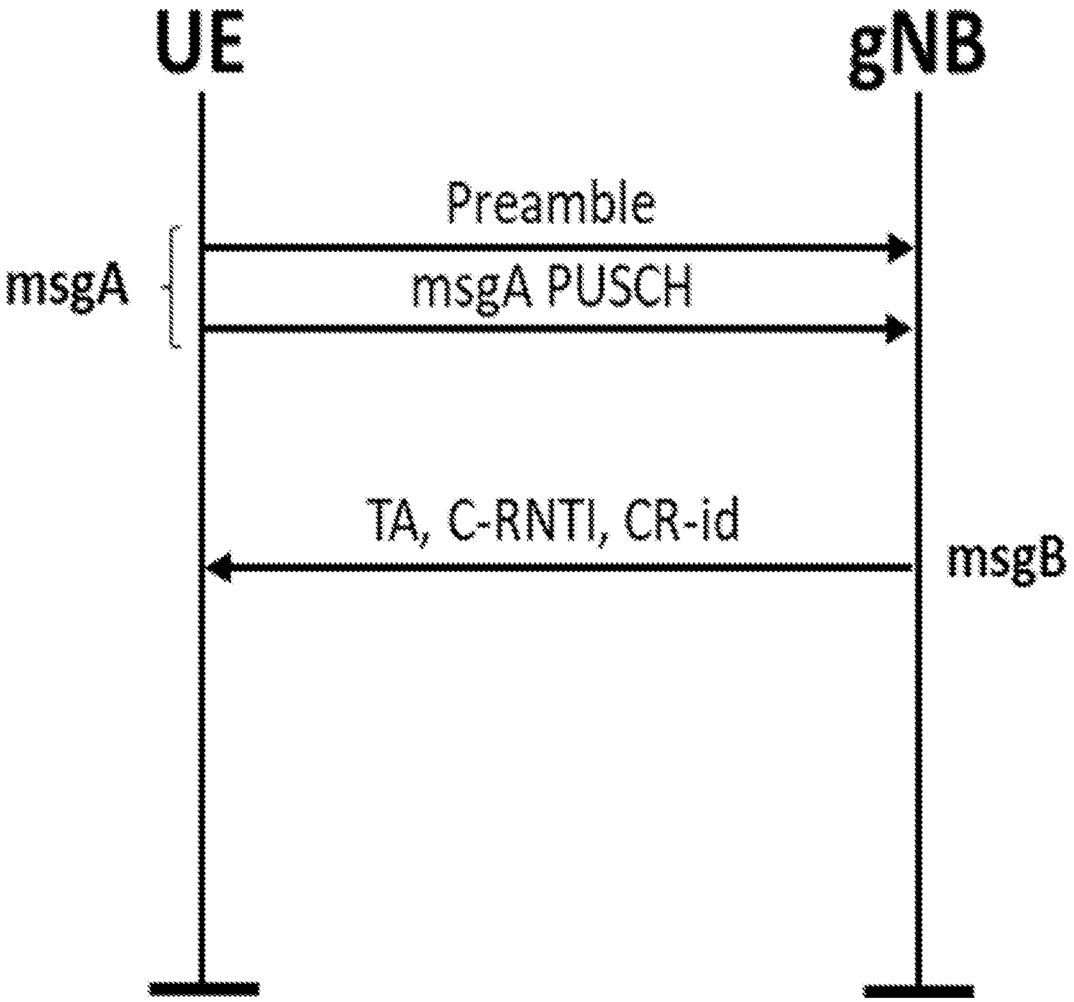
FIG. 2 is a sequence diagram illustrating prior art.
Figure 3:
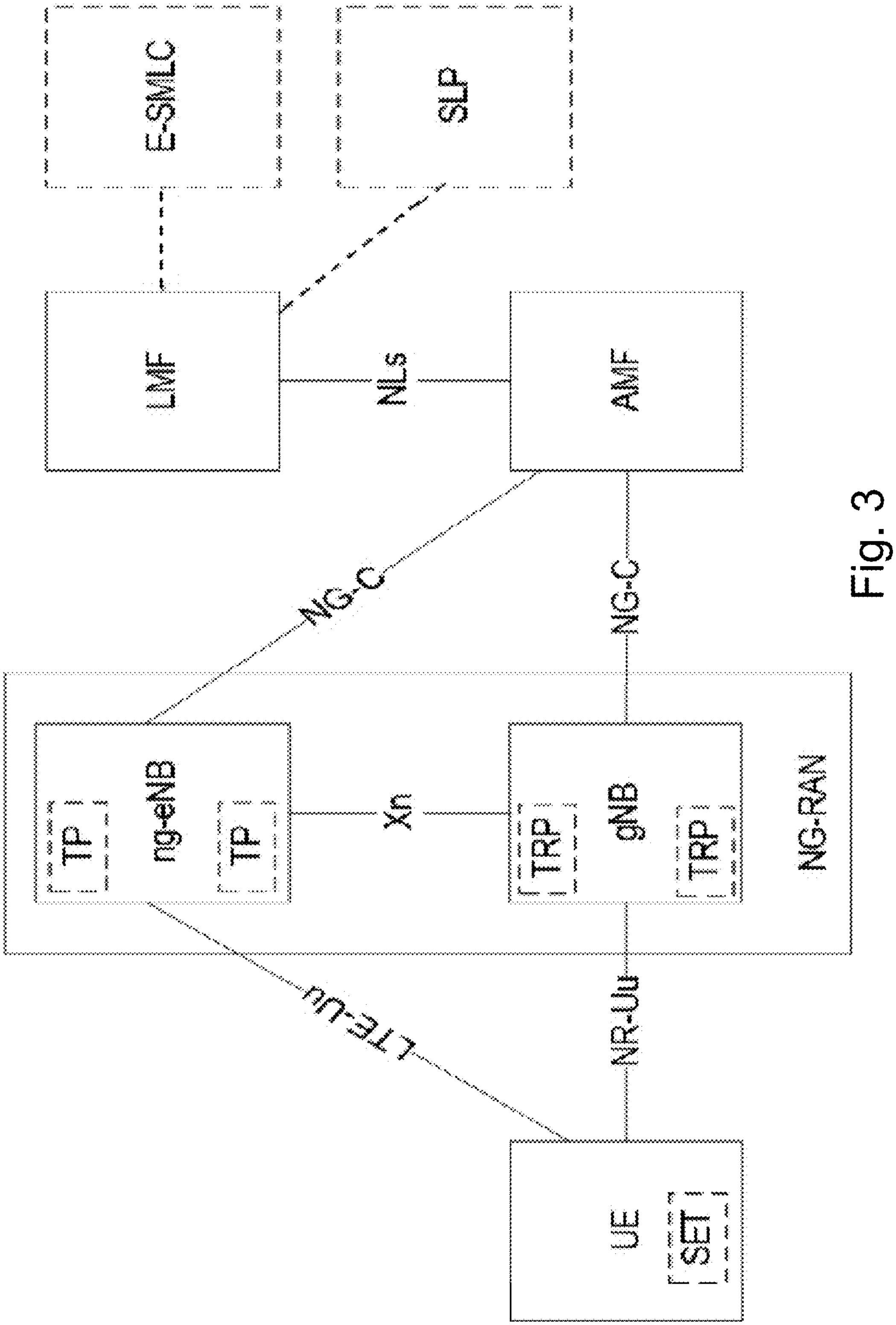
FIG. 3 is a schematic block diagrams illustrating prior art.
Figure 4:
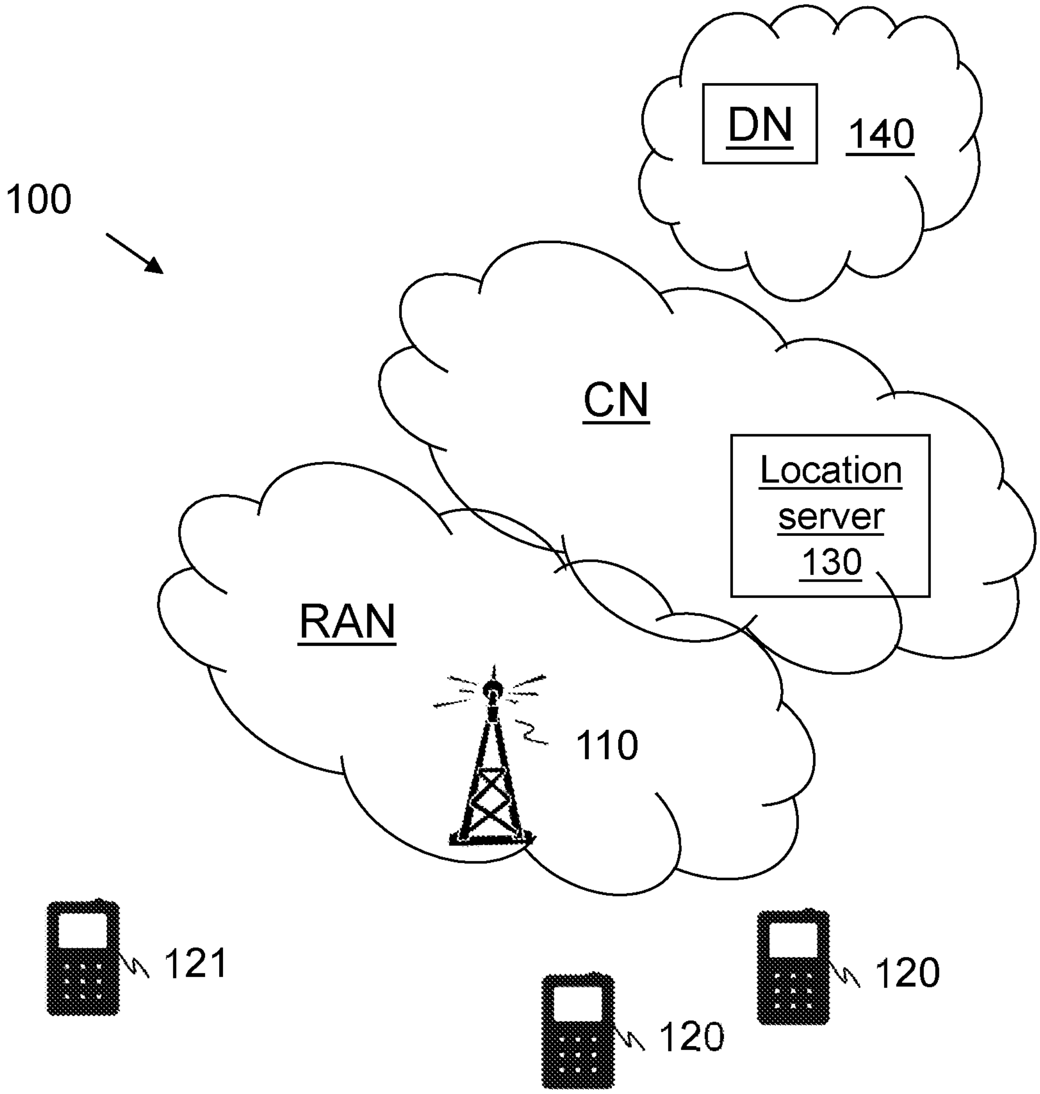
FIG. 4 is a schematic block diagram illustrating embodiments of a wireless communications network.

FIG. 4 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Wi-Fi, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes such as a RAN node 110 operate in the wireless communications network 100. The RAN node 110 e.g. provides a number of cells for communicating with e.g. UEs 120, 121. The RAN node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by the RAN node 110 depending e.g. on the radio access technology and terminology used. The as a RAN node 110 is also referred to as a node or a network node.

User Equipments operate in the wireless communications network 100, such as UEs 120 and a first UE 121, also referred to as UEs 120, 121. The UEs 120, 121 may each provide radio coverage by means of a number of antenna beams.

The UEs 120, 121 may each e.g. be an NR device, a mobile station, a wireless terminal, an NB-IoT device, an eMTC device, an NR RedCap device, a CAT-M device, a WiFi device, an LTE device and an a non-access point (non-AP) STA, a STA, that communicates via a base station such as e.g. the RAN node 110, one or more Access Networks (AN), e.g. RAN, to one or more core networks (CN), e.g. to a location server node 130. Further the UEs 120, 121 may each be configured to receive multicast transmissions when in inactive mode, such as e.g. Multicast Broadcast Service (MBS). The UEs 120, 121 may further each be a Vehicle-to-Everything (V2X) UE which e.g. may be connected to a multitude of sensors in a vehicle.

It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

CN nodes such as the Location Server node 130 operate in the wireless communications network 100. The Location Server node 130 may e.g. be an LMF node.

Methods herein may be performed by a node, this node may be any one out of the first UE 121, the RAN node 110, or the location server node 130. Therefore, this node is referred to as the node 110, 121, 130 when the method is more generally described.

Some actions may be taken by a network node, this network node may be any one out of the RAN node 110 or the location server node 130. Therefore, this network node is referred to as the network node 110, 130 when the actions are more generally described.

Methods herein may in one aspect be performed by the node 110, 121, 130. As an alternative, a Distributed Node (DN) and functionality, e.g. comprised in a cloud 140 as shown in FIG. 4, may be used for performing or partly performing the methods.

Figure 5:
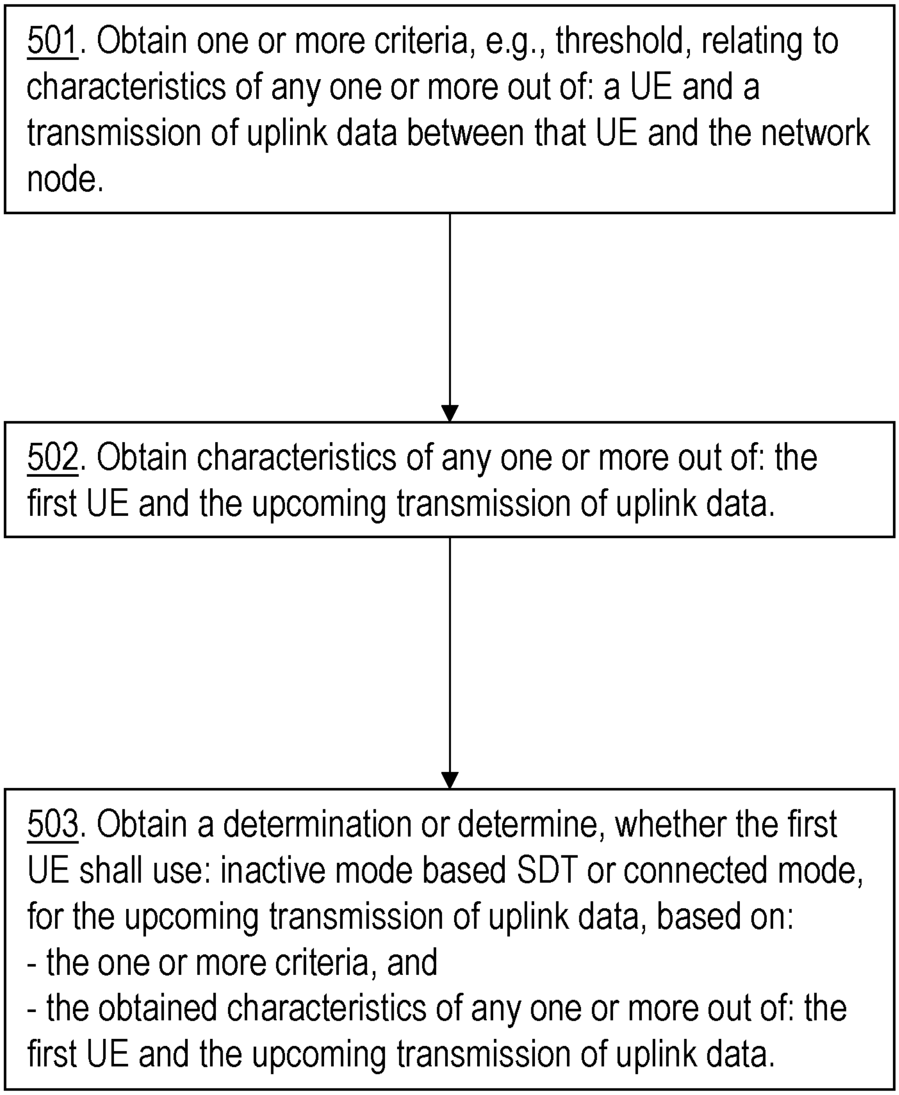
FIG. 5 is a flowchart depicting embodiments of a method in a node.

FIG. 5 shows an example method performed by the node 110, 121, 130 e.g. for handling an upcoming transmission of uplink data between the first UE 121 and the network node 110, 130 in the wireless communications network 100. This means that the upcoming transmission of uplink data may be between the first UE 121 and the RAN node 110, or between the first UE 121 and the location server node 130. The uplink data may e.g. in some embodiments relate to positioning data, and/or measurement reports from the first UE 121. In some embodiments, uplink data comprises positioning data relating to positioning measurement reports of the first UE 121.

In some embodiments, the node 110, 121, 130 performing the method is represented by any one or more out of: the first UE 121, the RAN node 110, or a location server node 130. This means that the method may be performed by any one or more out of: the first UE 121, the RAN node 110, or a location server node 130.

In some embodiments, the network node 110, 130 is represented by any one or more out of: the RAN node 110, or a location server node 130.

The method comprises any one or more out of the actions below:

Action 501

The node 110, 121, 130 obtains one or more criteria, e.g. thresholds or triggers or rules. These criteria relate to characteristics of any one or more out of: a UE 120 and a transmission of uplink data between that UE 120 and the network node 110, 130. A characteristic related to the UE 120 may e.g. be Battery Life, e.g. Power headroom report, remaining power, or type of UE such as a V2X UE or a MBS UE. A characteristic related to the uplink data between that UE 120 and the network node 110, 130 may e.g. be QoS, e.g. Positioning accuracy and/or latency, Mobility Information, Coverage Information, e.g. normal coverage, poor coverage or extended coverage.

The node 110, 121, 130 may e.g. be configured with these one or more criteria to later on be capable of use the criteria for checking if a UE such as the first UE 121 is allowed to use inactive mode based SDT, or connected mode, when it is time for an upcoming transmission of uplink data. The criteria may be seen as a general rule to be applied for any UE 120 such as the first UE 121.

In some embodiments, wherein the node 110, 121, 130 performing the method is represented by a location server node 130, a criterion out of the one or more criteria comprises a response time. The response time comprises a time within which the first UE 121 shall provide a measurement result, and which criterion is set by the location server node 130. This is an advantage since the first UE 121 may not have adequate resources to transmit data using small data transmission in RRC Inactive state. Thus, the first UE 121 may check the configured resources for SDT or typical UL grant that the first UE 121 receives for SDT and whether it is enough to send data to meet the latency requirements. If the first UE 121 judges that this criterion is not meet, the first UE 121 may switch to connected mode which has dynamic scheduling and it would be much more efficient to meet latency requirements.

In some embodiments, the one or more criteria are obtained by being set by the network node 110, 130. In these embodiments, the node 110, 121, 130 obtains the one or more criteria by receiving them from the network node 110, 130.

In some embodiments, the one or more criteria relating to characteristics is used for setting thresholds for determining whether the first UE 121 shall use: (i) inactive mode based Small Data Transmission, SDT, or (ii) connected mode, for the upcoming transmission of uplink data.

In some embodiments, the one or more criteria relating to the characteristics of any one or more out of: a UE 120 and a transmission of uplink data between that UE 120 and the network node 110, comprises respective thresholds related to respective characteristics comprising any one or more out of:

- Battery Life, e.g. Power headroom report, remaining power,
- QoS, e.g. Positioning accuracy and/or latency,
- Mobility Information,
- Coverage Information, e.g. normal coverage, poor coverage or extended coverage,
- Multicast Broadcast Service, MBS-, Information, and
- V2X-Information, In some embodiments, the characteristics of any one or more out of: the first UE (121) and the upcoming transmission of uplink data, comprises any one or more out of:

- Battery Life of the first UE (121)
- QoS, e.g. Positioning accuracy and/or latency, required for the upcoming transmission of uplink data,
- Mobility of the first UE (121),
- Coverage available for the upcoming transmission, e.g. Indication of normal coverage, poor coverage or extended coverage,
- the upcoming transmission is Multicast Broadcast Service, MBS-based,
- the upcoming transmission is Vehicle-to-Everything, V2X-based Action 502

The node 110, 121, 130 obtains characteristics. These are e.g. obtained when it is time for an upcoming transmission of uplink data between the first UE 121 and the network node 110, 130. The characteristics relate to of any one or more out of: the first UE 121, and the upcoming transmission of uplink data between the first UE 121 and the network node 110, 130, for the first UE 121.

Action 503

As mentioned above, when it is time for an upcoming transmission of uplink data, the node 110, 121, 130 may e.g. use the one or more criteria to check if obtained characteristics related to a UE such as the first UE 121 allow the UE to use inactive mode based SDT, or if connected mode shall be used. The node 110, 121, 130 may obtain a determination. The determination may be decided by the node 110, 121, 130 or received determined by and received from any one out of: the first UE 121, the RAN node 110, or the location server node 130. The determination determines whether the first UE 121 shall use: (i) inactive mode based SDT, also referred to as grant or allow SDT usage, or (ii) connected mode, for the upcoming transmission of uplink data. The determination is based on the one or more criteria, and the obtained characteristics of any one or more out of: The first UE 121 and the upcoming transmission of uplink data.

In some embodiments, the node 110, 121, 130 obtains the determination, whether the first UE 121 shall use: (i) inactive mode based SDT or (ii) connected mode, by receiving the determination from the first UE 121.

In some embodiments, the node 110, 121, 130 performing the method is represented by the first UE 121. In some of these embodiments the first UE 121 determines whether the first UE 121 shall use (i) inactive mode based SDT or (ii) connected mode, by:

sending to a network node 110,130, the obtained characteristics of any one or more out of: the first UE 121 and the upcoming transmission of uplink data, and receiving from the network node 110,130, a recommendation whether the first UE 121 shall use: (i) inactive mode based SDT, or (ii) connected mode, which recommendation is a basis for the determining of whether the first UE 121 shall use: (i) inactive mode based SDT, or (ii) connected mode.

In some embodiments, the node 110, 121, 130 performing the method is represented by the RAN node 110. In some of these embodiments the RAN node 110 determines whether the first UE 121 shall use: (i) inactive mode based Small Data Transmission, SDT, or (ii) connected mode, is by:

sending to the location server node 130, the obtained characteristics of any one or more out of: the first UE 121 and the upcoming transmission of uplink data, and receiving from the location server node 130, a recommendation whether the first UE 121 shall use: (i) inactive mode based SDT, or (ii) connected mode, The recommendation is a basis for the determining of whether the first UE 121 shall use: (i) inactive mode based SDT, or (ii) connected mode.

The method will now be further explained and exemplified in below embodiments. These below embodiments may be combined with any suitable embodiment as described above.

Power headroom reports (PHR) are needed to provide support for power-aware packet scheduling. Power headroom reports are transmitted using MAC signalling.

Quality of Service (QoS) Positioning: QoS for positioning is here described mainly in terms of positioning accuracy and latency needs.

Different types of the criteria, such as e.g. thresholds or triggers, may e.g. relate to any one or more out of:

The characteristics of any one or more out of the UE 120, and the transmission of uplink data between that UE 120 and the network node 110, 130, and different types of characteristics of any one or more out of: the first UE 121 and the upcoming transmission of uplink data.

E.g., different types of the characteristic related criteria to be used for assessing corresponding characteristics of the first UE 121 will be described below.

Battery Life (Power)

A characteristic related criteria related to the UE 120, may be that remaining battery power shall fulfil a criteria such as a certain threshold, and a characteristic may be the remaining battery power in the first UE 121.

As such, for a positioning use case because of several reasons, e.g. need to provide feedback to the network node 110, 130 on transmitted PRS or to request PRS on demand, it is desired that the first UE 121 is in connected mode rather than the inactive mode. However, UE battery life is critical and if the first UE 121 battery is running low on power, it is desirable to use SDT.

Remaining battery power, power head room measurements-based trigger may be needed to decide whether the first UE 121 shall use: (i) inactive mode based Small Data Transmission, SDT, or (ii) connected mode, for the upcoming transmission of uplink data.

Thus, the network node 110, 130 may set a threshold separately for a positioning application which grants the first UE 121 to use SDT only if the PHR, remaining battery power is below certain threshold.

QoS

A characteristic related criteria related to transmission of uplink data, may be that the QoS shall fulfil a criteria such as a certain threshold corresponding to the desired QoS level, and a characteristic may be the available QoS of the upcoming transmission of uplink data for the first UE 121.

Some of the positioning application require high accuracy and it may even impact safety of human being. In such case, it is desired that a QoS level for positioning is defined which is based upon accuracy. E.g., only for QoS which is relaxed in terms of accuracy may be allowed to use SDT, else the first UE 121 is required to be in connected mode. There are positioning applications which may only need to be tracked once a day to know whether they have moved or in same position; for these applications based upon it's need of low QoS requirement, the node 110, 121, 130 may determine to grant SDT usage.

Thus, the network node 110, 130 may in some embodiments set a criteria such as a threshold separately for positioning application which determines to grant the first UE 121 to use SDT only if the QoS need is low, i.e. accuracy needed is low; large error tolerated.

Further, for these sorts of high accuracy needs, it may in some embodiments also be desired that the latency is minimum. Hence, it is desirable the first UE 121 is in connected mode rather than being in inactive mode. Being in Inactive mode would imply a need of segmentation, e.g. a need of subsequent data transmission, which may require more processing because of large data, positioning measurement result, that needs to be delivered. In connected mode, the bandwidth (BW) may be larger, and the first UE 121 would be able to dispatch at once; i.e. avoid segmentation etc. In connected mode, the the network node 110, 130 may use link adaptation and beam forming techniques which may not be that adapt for Inactive mode transmission.

The location server node 130 such as the LMF also may set response time as a criterion; a time within which the first UE 121 should provide the measurement result. Hence, the network node 110, 130 may define the threshold for SDT with respect to the configured response Time. An example may be when the network node 110, 130 has set a low response Time and if the transition from inactive to connected takes longer duration; the first UE 121 may provide the result using SDT.

Mobility

A characteristic related criteria related to a UE, such as the first UE 121, may be that the UE mobility shall also be considered and fulfil a criteria, e.g. that the timing advance (TA) value is valid, and a characteristic may be whether the first UE 121 is on move.

For a configured grant SDT mechanism, it may be required that the TA value is valid. A positioning application as such is typically involves when the first UE 121, is on move and thus to identify location in certain intervals and hence previous configuration such as a Configured grant may not be any longer valid. Hence, UE mobility may also be considered when determining whether to grant SDT usage. The network node 110, 130 may classify the first UE 121 in certain categories such as e.g. Pedestrian, or Vehicular, and only allow SDT to be used for low mobility or Pedestrian UEs or for event trigger based UEs (non-mobility). Further, the mobility may be motion triggered based upon sensor such as inertial motion unit; an example based upon relative displacement as defined in LPP specification. The mobility may be also defined in terms of TA validity. When TA validity is applicable to a certain location and if TA offset varies with certain threshold, the first UE 121 may be considered in motion or mobile.

Combined Metric

In some embodiments, the network node 110, 130 may also set the criteria in dedicated signaling on whether the first UE 121 is allowed to use SDT or not. The network node 110, 130 may determine based upon various factors such as QoS need of the periodical measurement reporting that the first UE 121 has to perform, application type, UE PHR and other characteristics mentioned herein. Thus, for an upcoming transmission of uplink data such as any subsequent transmission, when the first UE 121 has to perform any new and/or further uplink transmission, for the same application it performs the procedure as instructed by the network node 110, 130 in a dedicated signaling.

The network node 110, 130 may define a function which may consider number of the characteristics such as metrics and deduce a single value and threshold to facilitate whether the first UE 121 should be allowed to use SDT or not and such information may be conveyed to the first UE 121 via Broadcast. The function is also then evaluated on the first UE 121 side and the comparison is made against the criterion, e.g. threshold value to make the determination on whether the first UE 121 shall use: (i) inactive mode based SDT or (ii) connected mode, for the upcoming transmission of uplink data.

Func=SDT_Trigger (BSR, PHR, Remaining battery power, QoS, Mobility . . . ) which e.g. means that the first UE 121 does not make a decision based upon single parameter and/or metric but based upon different parameters and/or metrics; especially for positioning it uses latency, QoS, also into account.

Signaling Between the Location Server Node 130 Such as an LMF and the RAN Node 110 Such as gNB In some embodiments, in order to facilitate SDT usage the network node 110, 130 e.g. network entities such as LMF and gNB may coordinates via NRPPa and exchanges PHR and QoS info. If the decision is to be made via LTE Positioning Protocol (LPP) signaling, then PHR report is provided to the location server node 130 such as the LMF in NR Positioning Protocol Annex (NRPPa) by gNBs such as the RAN node 110 or by the first UE 121 via LPP. If the determination is to be made via the RAN node 110, then QoS for positioning and the first UE 121 mobility information is provided to the RAN node 110 via NRPPa from the location server node 130.

Further, the determination may be made by the location server node 130 and suggested to NG-RAN nodes such as the RAN node 110 as a recommendation and the final determination is left to the RAN node 110 on deciding whether the first UE 121 shall use: (i) inactive mode based SDT, or (ii) connected mode, for the upcoming transmission of uplink data. The recommendation may be provided in NRPPa.

Alternatively, such determining may be provided by the location server node 130 to the first UE 121 via LPP for procedures such as deferred mobile terminating location request procedure according to embodiments herein, described in 3GPP TS 38.305v16.3.0. Some possible change required according to embodiments herein is underlined in the below standard related text: 7.3.4 Deferred MT-LR Event Reporting Support.

3GPP 7.3.4 Deferred MT-LR Event Reporting Support

Figure 6:
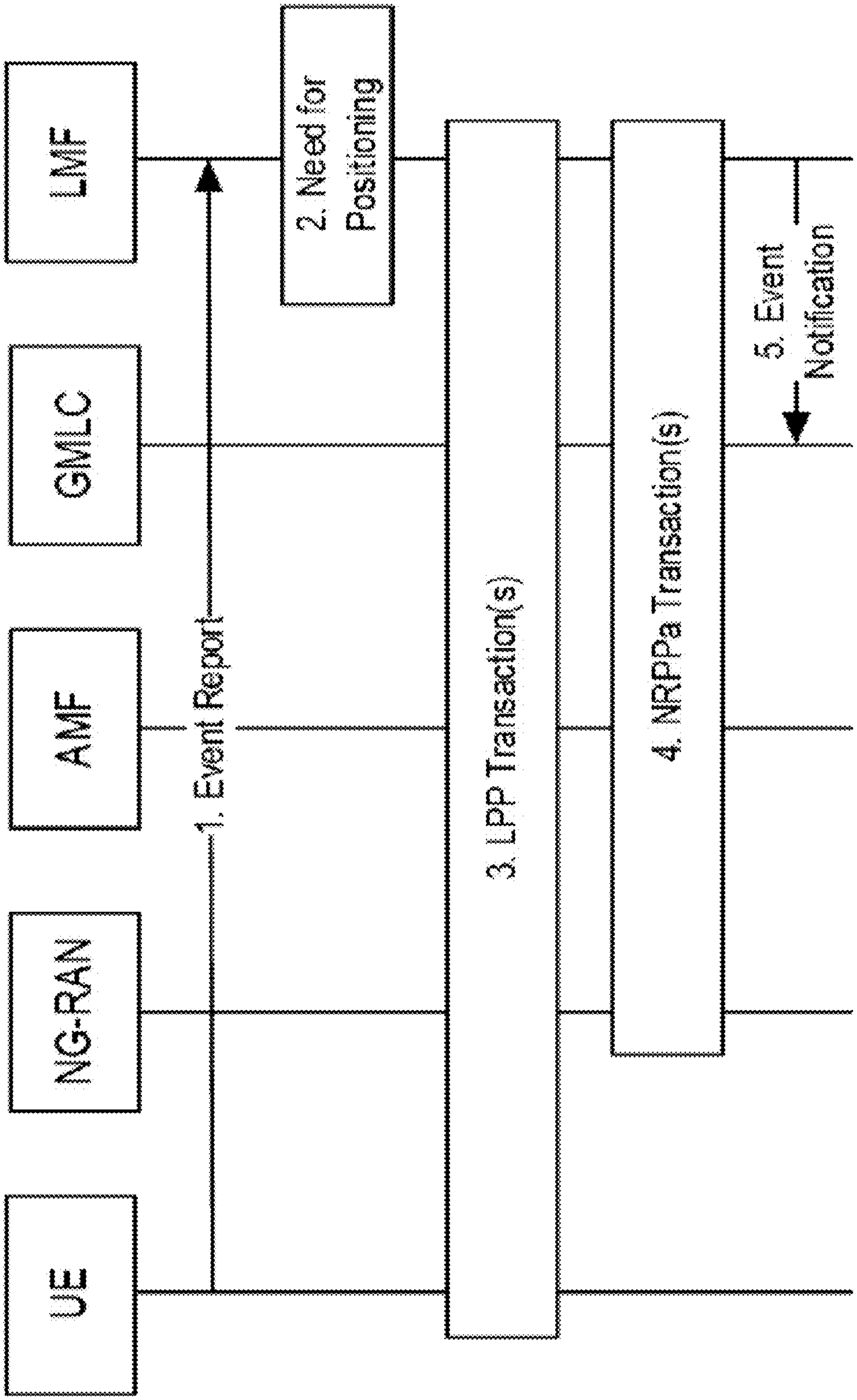
FIG. 6 is a schematic sequence diagram illustrating an embodiment herein.
Figure 7:
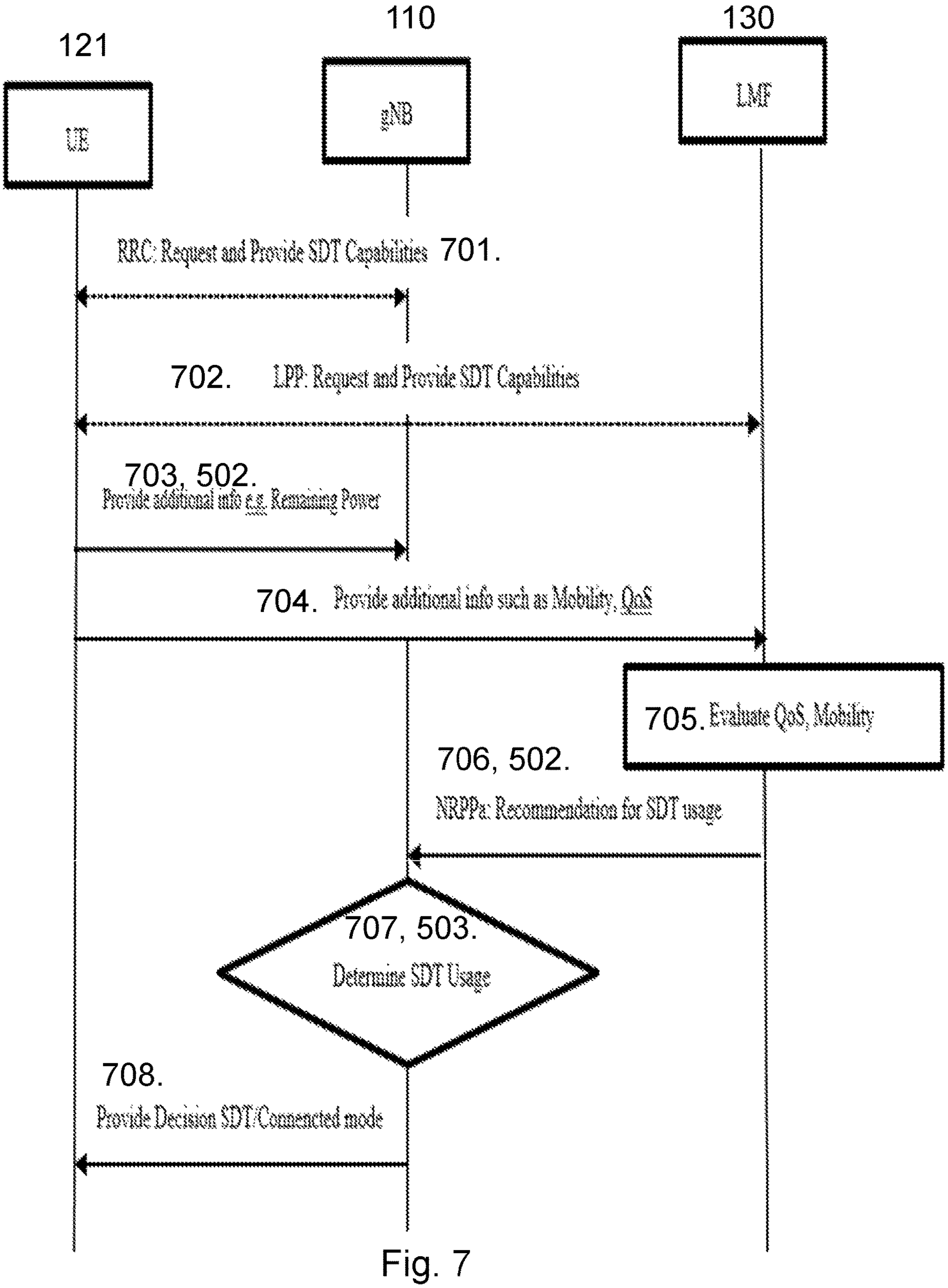
FIG. 7 is a combined flowchart and sequence diagram illustrating an embodiment herein.

FIG. 6 shows a 3GPP Figure 7.3.4-1 UE Positioning Operations to support a Deferred MT-LR, according to embodiments herein. FIG. 6 shows the sequence of operations for a Deferred MT-LR Event Reporting starting at the point where the UE, such as the first UE 121, reports an event to the LMF (such as the location server node 130).

1. The UE (such as the first UE 121) sends a supplementary services event report message to the LMF as described in 3GPP TS 24.571 which is transferred via the serving AMF and is delivered to the LMF (such as the location server node 130) using an Namf_Communication_N1MessageNotify service operation. The event report may indicate the type of event being reported and may include an embedded positioning message which includes any location measurements or location estimate.
2. If LMF (such as the location server node 130) determines no positioning procedure is needed, steps 3 and 4 are skipped.
3. The LMF (such as the location server node 130) may utilize any location information received in step 1. The LMF may also retrieve location related information from the UE and/or from the serving NG-RAN Node, referred to as gNB (such as the RAN node 110). In the former case, the LMF (such as the location server node 130) instigates one or more LPP procedures to provide assistance data to the UE (such as the first UE 121) and/or obtain location information from the UE (such as the first UE 121). The LMF (such as the location server node 130) may instruct the UE (such as the first UE 121) to provide measurement report using small data transmission. The UE (such as the first UE 121) may also instigate one or more LPP procedures after the first LPP message is received from the LMF (such as the location server node 130) (e.g., to request assistance data from the LMF (such as the location server node 130)).
4. If the LMF (such as the location server node 130) needs location related information for the UE (such as the first UE 121) from the NG-RAN (such as the RAN node 110), the LMF (such as the location server node 130) instigates one or more NRPPa procedures. Step 3 is not necessarily serialised with step 2; if the LMF (such as the location server node 130) and NG-RAN Node (such as the RAN node 110) have the information to determine what procedures need to take place for the location service, step 3 could precede or overlap with step 2. The LMF (such as the location server node 130) may include the recommendation of SDT usage for the UE (such as the first UE 121) to NG-RAN (such as the RAN node 110).
5. The LMF (such as the location server node 130) invokes an Nlmf_Location_EventNotify service operation towards the GMLC with an indication of the type of event being reported and any location estimate obtained as a result of steps 2 and 3.

UE Prioritization of Positioning Data

There may be cases when the first UE 121 battery power is low whereas the Positioning QoS needed is high. It may be difficult to select whether SDT is preferred or connected mode is preferred. In such cases, where the first UE 121 has performed measurements and has large measurement data to be sent to the network node 110, 130 to accurately get its position but then the remaining first UE 121 battery power is low; the first UE 121 may prioritize on the large measurement data that is available to be uploaded; i.e certain UE rules may e.g. be defined as below.

a) Filter results which a UE such as the first UE 121, judges that they are based upon LOS or resulting in low number of multipaths.

b) Filter results which provides high RSRP results, i.e. leaves out result which has low RSRP.

c) Provide the result that would fit in an UL grant as per the Assistance Data prioritization by the NW, such as the network node 110, 130, NW may provide AD for the first UE 121 to perform measurement based upon some prioritized order with list of TRPs; thus, the first UE 121 provides the result in the same order and provides the result for only those Transmission Reception Points (TRPs) that would fit in one UL grant via SDT.

Hence, the first UE 121 may omit the result in some prioritized criteria as above and only provide result which would fit in one UL grant from the NW such as the network node 110, 130, via SDT, i.e. avoid having to go to connected mode or perform subsequent transmission in Inactive Mode to save the first UE 121 battery but still providing high quality result.

MBS-Based Criterion, Such as e.g. Triggers

A characteristic related criteria related to a UE, may be MBS-based, and a characteristic may be whether the first UE 121 is configured to use MBS.

In some embodiments, the first UE 121 may be configured to receive multicast transmissions when in inactive mode. Multicast is inherently downlink only, so this may be supported as long as the first UE 121 can maintain downlink sync. A Multicast service implies the network node 110, 130 is part of a multicast group, also known as MBS session or multicast session. The signalling for joining and leaving a multicast group may be carried as NAS signalling. This signalling may be quite small and may therefore be used as a criterion, e.g. a trigger for SDT connection (rather than going to connected mode). Examples of criteria such as triggers to determining 503, whether the first UE (121) shall use: (i) inactive mode based Small Data Transmission, SDT, or (ii) connected mode, for the upcoming transmission of uplink data, such as e.g. in this example to select SDT, may therefore be related to one or multiple of the following.

The first UE 121 intends to:

a) Leave one or multiple multicast group(s)

b) Join one or multiple multicast group(s)

c) Modify properties of one or multiple multicast group(s)

The above may also be understood as the data traffic related to the aforementioned actions becomes available to the access stratum.

V2X-Based Triggers Such as e.g. Triggers

A characteristic related criteria related to a UE, may be V2X-based, and a characteristic may be whether the first UE 121 a V2X UE.

A V2X first UE 121 may be connected to a multitude of sensors in a vehicle, including but not limited to velocity, oil pressure, tire pressure, amount of fuel, cameras, microphones, air quality sensors, exhaust gas sensors, distance to other vehicles, deployment of active safety systems, brake status etc. This data is expected to be small and may benefit to be transmitted as SDT instead of over connected mode. Examples of criteria, e.g. triggers, to determining 503, whether the first UE 121 shall use: (i) inactive mode based SDT, or (ii) connected mode, for the upcoming transmission of uplink data, such as e.g. select SDT, may therefore be one or multiple of the following:

The first UE 121 intends to:

Transmit data related to a V2X sensor, including but not limited to velocity, oil pressure, tire pressure, amount of fuel, cameras, microphones, air quality sensors, exhaust gas sensors, distance to other vehicles, deployment of active safety systems, brake status etc.

The above may also be understood as the data traffic related to the aforementioned actions becomes available to the access stratum.

FIG. 7 depicts an example where the node 110, 121, 130, performing the method is the RAN node 110. The RAN node 110 determines 503, whether the first UE 121 shall use: (i) inactive mode based SDT, or (ii) connected mode, for the upcoming transmission of uplink data, such as e.g. grants SDT or instructs to use connected mode.

The example scenario of FIG. 7, comprises:

701. According to RRC, the first UE 121 may requests SDT Capabilities and the network node 110, 130 such as the gNB 110 may provide SDT Capabilities

702. According to LPP, the first UE 121 may request SDT Capabilities and the network node 110, 130 such as the LMF 130 may provide SDT Capabilities.

703, 502. The first UE 121 provides additional info e.g. Remaining Power to the network node 110, 130 such as the gNB 110.

704. The first UE 121 provides additional info such as Mobility, QoS to the network node 110, 130 such as the LMF 130.

705. The network node 110, 130 such as the LMF 130 Evaluates the QoS, Mobility.

706, 502. According to NRPPa, The network node 110, 130 such as the LMF 130 sends a recommendation for SDT usage to the network node 110, 130 such as the gNB 110.

707, 503. The network node 110, 130 such as the gNB 110 determines SDT usage.

708. The network node 110, 130 such as the gNB 110 provides a Decision whether (i) inactive mode based SDT, or (ii) connected mode, shall be used for the upcoming transmission of uplink data.

The final determination, also referred to as de decision, may also be made via the as the location server node 130, and informed to the first UE 121) via LPP.

Figure 8:
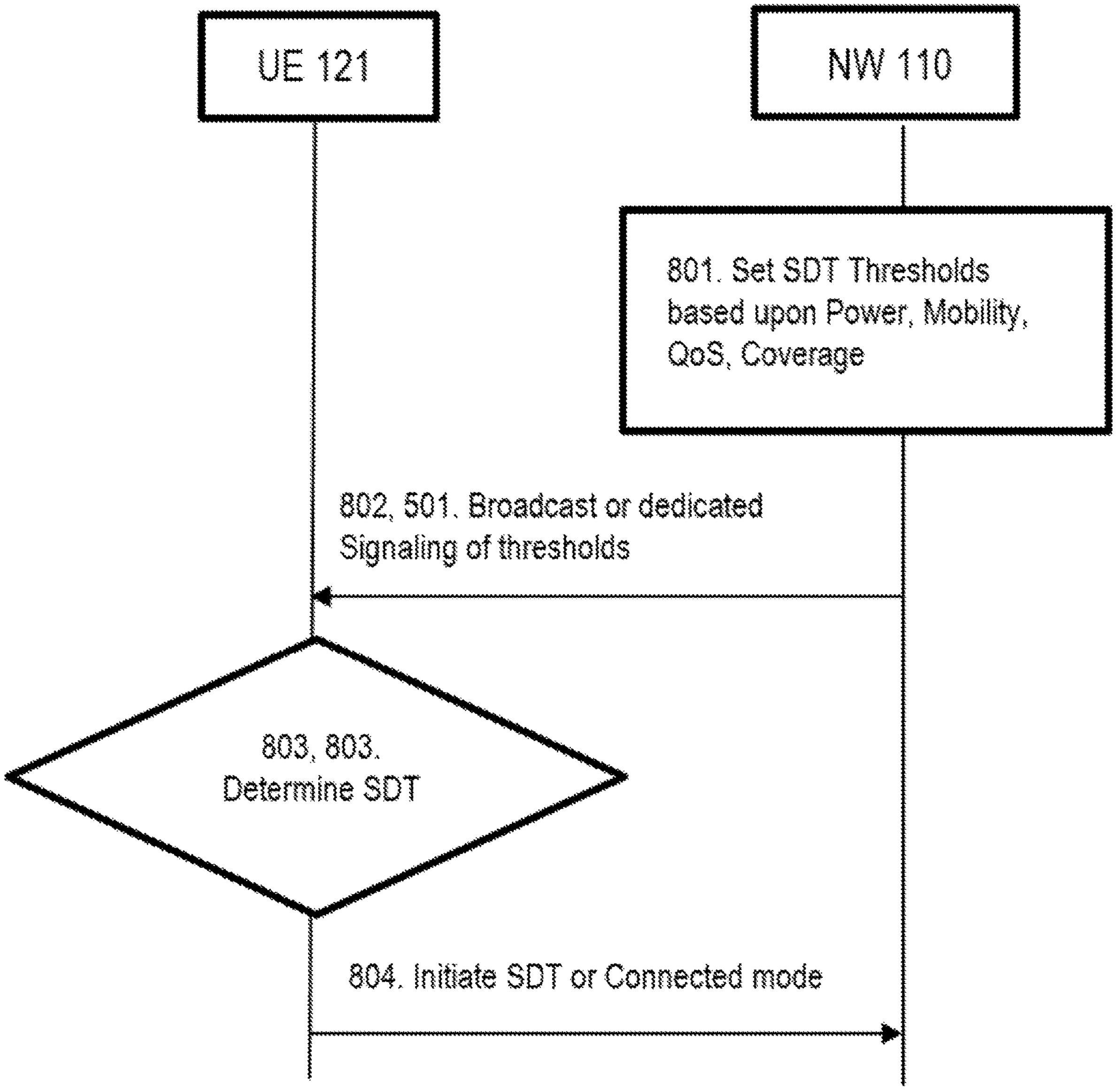
FIG. 8 is a combined flowchart and sequence diagram illustrating an embodiment herein.

FIG. 8 depicts an example embodiment where the node 110, 121, 130, performing the method is the first UE 121. In an example embodiment, the RAN node 110, referred to as NW 110 in FIG. 8, sets 801 the one or more criteria such as e.g. the various thresholds and sends them to the first UE 121. The first UE 121 obtains 802, 501 one or more criteria from the RAN node 110 and obtains its own characteristics. The first UE 121 then determines 803, 503, whether the first UE 121 shall use: (i) inactive mode based SDT, or (ii) connected mode, for the upcoming transmission of uplink data, such as e.g. grants SDT or instructs to use connected mode. The first UE 121 Initiates 804 the determined SDT or Connected mode.

Some further embodiments provided herein are described below:

A method is provided, performed by a wireless device such as the first UE 121, to determine whether SDT may be used or connected mode is preferred based upon evaluation of several factors such as PHR, QoS, Mobility, Coverage, MBS, V2X.

A method is provided, performed by wireless device, such as the first UE 121, to report its PHR to Location server 130.

A method is provided, performed by wireless device, such as the first UE 121, to receive an instruction from the network node 110, 130 on whether SDT procedure is granted/allowed or not.

A method is provided, performed by the location server node 130 to assess UE 121 power for determination of SDT for future transmissions from the first UE 121.

A method is provided, performed by the location server node 130 to recommend usage of SDT for a particular UE such as the first UE 121, or for particular QoS type to a radio base station (gNB), such as the RAN node 110.

A method is provided, performed by the location server node 130, to inform QoS and Mobility information to radio base station (gNB), such as the RAN node 110, in order for the gNB, such as the RAN node 110, to determine SDT for a UE, such as the first UE 121.

A method is provided, performed by the RAN node 110 to inform the location server node 130 about the UE 121 PHR.

A method is provided, performed by such as the RAN node 110, to set the thresholds for QoS, PHR, Mobility, Coverage, MBS, V2X for SDT usage determination.

Figure 9A:
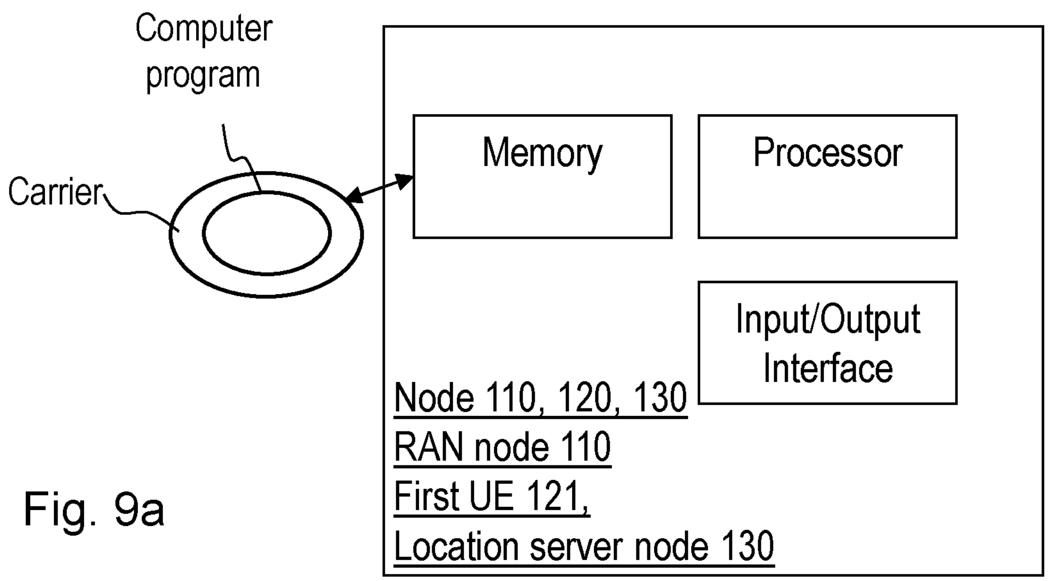
FIGS. 9 *a* and *b* are schematic block diagrams illustrating embodiments of a node.
Figure 9B:
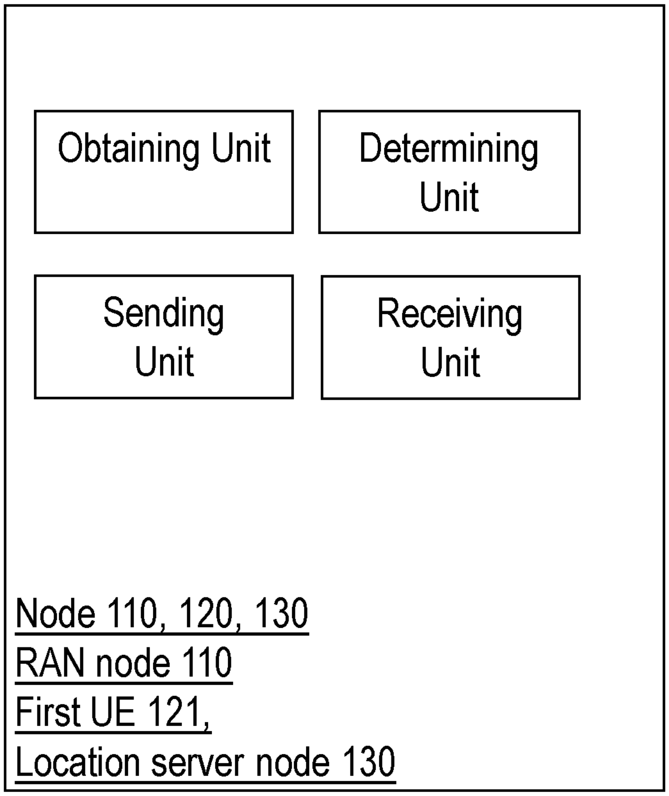

FIGS. 9*a* and 9*b* shows an example of arrangement in the node 110, 121, 130, e.g. the RAN node 110, the first UE 121 or the location server node 130. The node 110, 121, 130, e.g. the RAN node 110, the first UE 121 or the location server node 130, may comprise an input and output interface configured to communicate with each other. The input and output interface may comprise a wireless receiver (not shown) and a wireless transmitter (not shown).

The node 110, 121, 130, e.g. the RAN node 110, the first UE 121 or the location server node 130, may comprise an obtaining unit, a sending unit, receiving unit, and a determining unit to perform the method actions as described herein.

The embodiments herein may be implemented through a respective processor or one or more processors, such as the processor of a processing circuitry in the node 110, 121, 130, e.g. the RAN node 110, the first UE 121 or the location server node 130, depicted in FIG. 9*a*, together with computer program code for performing the functions and actions of the embodiments herein. The program code mentioned above may also be provided as a computer program product, for instance in the form of a data carrier carrying computer program code for performing the embodiments herein when being loaded into the node 110, 121, 130, e.g. the RAN node 110, the first UE 121 or the location server node 130. One such carrier may be in the form of a CD ROM disc. It is however feasible with other data carriers such as a memory stick. The computer program code may furthermore be provided as pure program code on a server and downloaded to the node 110, 121, 130, e.g. the RAN node 110, the first UE 121 or the location server node 130.

The node 110, 121, 130, e.g. the RAN node 110, the first UE 121 or the location server node 130, may further comprise respective a memory comprising one or more memory units. The memory comprises instructions executable by the processor in the node 110, 121, 130, e.g. the RAN node 110, the first UE 121 or the location server node 130.

The memory is arranged to be used to store instructions, data, configurations, and applications to perform the methods herein when being executed in the node 110, 121, 130, e.g. the RAN node 110, the first UE 121 or the location server node 130.

In some embodiments, a computer program comprises instructions, which when executed by the at least one processor, cause the at least one processor of the node 110, 121, 130, e.g. the RAN node 110, the first UE 121 or the location server node 130, to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the node 110, 121, 130, e.g. the RAN node 110, the first UE 121 or the location server node 130, described below may refer to a combination of analog and digital circuits, and/or one or more processors configured with software and/or firmware, e.g. stored in the node 110, 121, 130, e.g. the RAN node 110, the first UE 121 or the location server node 130, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Below, some example embodiments 1-18 are shortly described.

Embodiment 1. A method performed by a node 110, 121, 130, e.g. a first UE 121, a RAN node gNB 110 or a location server node 130, e.g. for handling an upcoming transmission of uplink data between a first User Equipment, UE, 121 and a network node 110, 130 in a wireless communications network 100, wherein the uplink data e.g. relates to measurement reports of the first UE 121, the method e.g. comprising any one out of:

obtaining 501 one or more criteria, e.g. threshold, relating to characteristics of any one or more out of: a UE 120 and a transmission of uplink data between that UE 120 and the network node 110, 130, e.g. as a general rule to be applied for any UE 120, obtaining 502 characteristics of any one or more out of: the first UE 121 and the upcoming transmission of uplink data, i.e. for the first UE 121, obtaining 503 a determination e.g. by determining 503, whether the first UE (121) shall use: (i) inactive mode based Small Data Transmission, SDT, or (ii) connected mode, for the upcoming transmission of uplink data, based on:

the one or more criteria, and the obtained characteristics of any one or more out of: the first UE 121 and the upcoming transmission of uplink data.

Embodiment 2. The method according to embodiment 1, wherein any one or more out of:

the node 110, 121, 130 performing the method is represented by any one or more out of: the first UE 121, the RAN node 110, or a location server node 130, and wherein the network node 110, 130 is represented by any one or more out of: the RAN node 110, or a location server node 130.

Embodiment 3. The method according to any of embodiments 1-2, wherein the obtaining 503 of the determination, whether the first UE 121 shall use: (i) inactive mode based Small Data Transmission, SDT, or (ii) connected mode, is performed by receiving the determination from the first UE 121 and wherein:

the one or more criteria are by being set by the network node 110, 130 and are obtained 501 by receiving them from the network node 110, 130.

Embodiment 4. The method according to any of embodiments 1-3, wherein the uplink data comprises positioning data relating to positioning measurement reports of the first UE 121.

Embodiment 5. The method according to any of embodiments 1-4, wherein the one or more criteria relating to characteristics is used for setting thresholds for determining whether the first UE 121 shall use: (i) inactive mode based Small Data Transmission, SDT, or (ii) connected mode, for the upcoming transmission of uplink data.

Embodiment 6. The method according to any of embodiments 1-5, wherein the one or more criteria relating to the characteristics of any one or more out of: a UE 120 and a transmission of uplink data between that UE 120 and the network node 110, comprises respective thresholds related to respective characteristics comprising any one or more out of:

Battery Life, e.g. Power headroom report, remaining power,

QoS, e.g. Positioning accuracy and/or latency

Mobility Information

Coverage Information, e.g. normal coverage, poor coverage or extended coverage

Multicast Broadcast Service, MBS-Information

V2X-Information

Embodiment 7. The method according to any of embodiments 1-6, wherein the characteristics of any one or more out of: the first UE 121 and the upcoming transmission of uplink data, comprises any one or more out of:

Battery Life of the first UE 121

QoS, e.g. Positioning accuracy and/or latency, required for the upcoming transmission of uplink data, Mobility of the first UE 121, Coverage available for the upcoming transmission, e.g. Indication of normal coverage, poor coverage or extended coverage, the upcoming transmission is Multicast Broadcast Service, MBS-based, the upcoming transmission is Vehicle-to-Everything, V2X-based Embodiment 8. The method according to any of embodiments 1-7, wherein the node 110, 121, 130 performing the method is represented by the first UE 121, and wherein the determining 503 whether the first UE 121 shall use: (i) inactive mode based Small Data Transmission, SDT, or (ii) connected mode, is performed by:

sending to a network node 110,130, the obtained characteristics of any one or more out of: the first UE 121 and the upcoming transmission of uplink data, and receiving from the network node 110,130, a recommendation whether the first UE 121 shall use: (i) inactive mode based Small Data Transmission, SDT, or (ii) connected mode, which recommendation is a basis for the determining 503 whether the first UE 121 shall use: (i) inactive mode based Small Data Transmission, SDT, or (ii) connected mode.

Embodiment 9. A computer program comprising instructions, which when executed by a processor, causes the processor to perform actions according to any of the embodiments 1-8.

Embodiment 10. A carrier comprising the computer program of embodiment 9, wherein the carrier is one of an electronic signal, an optical signal, an electromagnetic signal, a magnetic signal, an electric signal, a radio signal, a microwave signal, or a computer-readable storage medium.

Embodiment 11. A node 110, 121, 130, /e.g. a first UE 121, a RAN node, e.g. gNB, 110 or a location server node 130, e.g. configured to handle an upcoming transmission of uplink data between a first User Equipment, UE, 121 and a network node 110, 130 in a wireless communications network 100, wherein the uplink data e.g. is adapted to relate to measurement reports of the first UE 121, the node 110, 121, 130 e.g. being configured to any one out of:

obtain, e.g. by means of an obtaining unit, one or more criteria, e.g. threshold, relating to characteristics of any one or more out of: a UE 120 and a transmission of uplink data between that UE 120 and the network node 110, 130/e.g. as a general rule for any UE obtain, e.g. by means of the obtaining unit, characteristics of any one or more out of: the first UE 121 and the upcoming transmission of uplink data, /which e.g. may mean characteristics for the first UE 121, obtain, e.g. by means of the obtaining unit, a determination or determine e.g. by means of a determining unit, whether the first UE 121 shall use: (i) inactive mode based Small Data Transmission, SDT, or (ii) connected mode, for the upcoming transmission of uplink data, based on:

the one or more criteria, and the obtained characteristics of any one or more out of: the first UE 121 and the upcoming transmission of uplink data.

Embodiment 12. The node 110, 121, 130 according to embodiment 11, wherein any one or more out of:

the node 110, 121, 130 is adapted to be represented by any one or more out of: the first UE 121, the RAN node 110, or a location server node 130, and wherein the network node 110, 130 is adapted to be represented by any one or more out of: the RAN node 110, or a location server node 130.

Embodiment 13. The node 110, 121, 130 according to any of embodiments 11-12, further configured to obtain, e.g. by means of the obtaining unit, the determination, whether the first UE 121 shall use: (i) inactive mode based Small Data Transmission, SDT, or (ii) connected mode, by receiving, e.g. by means of a receiving unit, the determination from the first UE 121 and wherein:

the one or more criteria are adapted to be set by the network node 110, 130 and are arranged to be obtained by receiving them, e.g. by means of the receiving unit, from the network node 110, 130.

Embodiment 14. The node 110, 121, 130 according to any of embodiments 11-13, wherein the uplink data is adapted to comprise positioning data relating to positioning measurement reports of the first UE 121.

Embodiment 15. The node 110, 121, 130 according to any of embodiments 11-14, wherein the one or more criteria relating to characteristics are adapted to be used for setting thresholds for determining, e.g. by means of the determining unit, whether the first UE 121 shall use: (i) inactive mode based Small Data Transmission, SDT, or (ii) connected mode, for the upcoming transmission of uplink data.

Embodiment 16. The node 110, 121, 130 according to any of embodiments 11-15, wherein the one or more criteria relating to the characteristics of any one or more out of: a UE 120 and a transmission of uplink data between that UE 120 and the network node 110, are adapted to comprise respective thresholds related to respective characteristics comprising any one or more out of:

Battery Life, e.g. Power headroom report, remaining power,

QoS, e.g. Positioning accuracy and/or latency

Mobility Information

Coverage Information, e.g. normal coverage, poor coverage or extended coverage Multicast Broadcast Service, MBS-Information V2X-Information Embodiment 17. The node 110, 121, 130 according to any of embodiments 11-16, wherein the characteristics of any one or more out of: the first UE 121 and the upcoming transmission of uplink data, are adapted to comprise any one or more out of:

Battery Life of the first UE 121

QoS, e.g. positioning accuracy and/or latency, required for the upcoming transmission of uplink data, Mobility of the first UE 121, Coverage available for the upcoming transmission, e.g. Indication of normal coverage, poor coverage or extended coverage, the upcoming transmission is Multicast Broadcast Service, MBS-based, the upcoming transmission is Vehicle-to-Everything, V2X-based Embodiment 18. The node 110, 121, 130 according to any of embodiments 11-17, adapted to be represented by the first UE 121, and configured to determine, e.g. by means of the determining unit, whether the first UE 121 shall use: (i) inactive mode based Small Data Transmission, SDT, or (ii) connected mode, by:

sending, e.g. by means of a sending unit, to a network node 110,130, the obtained characteristics of any one or more out of: the first UE 121 and the upcoming transmission of uplink data, and receiving, e.g. by means of the receiving unit, from the network node 110,130, a recommendation whether the first UE 121 shall use: (i) inactive mode based Small Data Transmission, SDT, or (ii) connected mode, which recommendation is arranged to be a basis for determining, e.g. by means of the determining unit, whether the first UE 121 shall use: (i) inactive mode based Small Data Transmission, SDT, or (ii) connected mode.

Further Extensions and Variations

Figure 10:
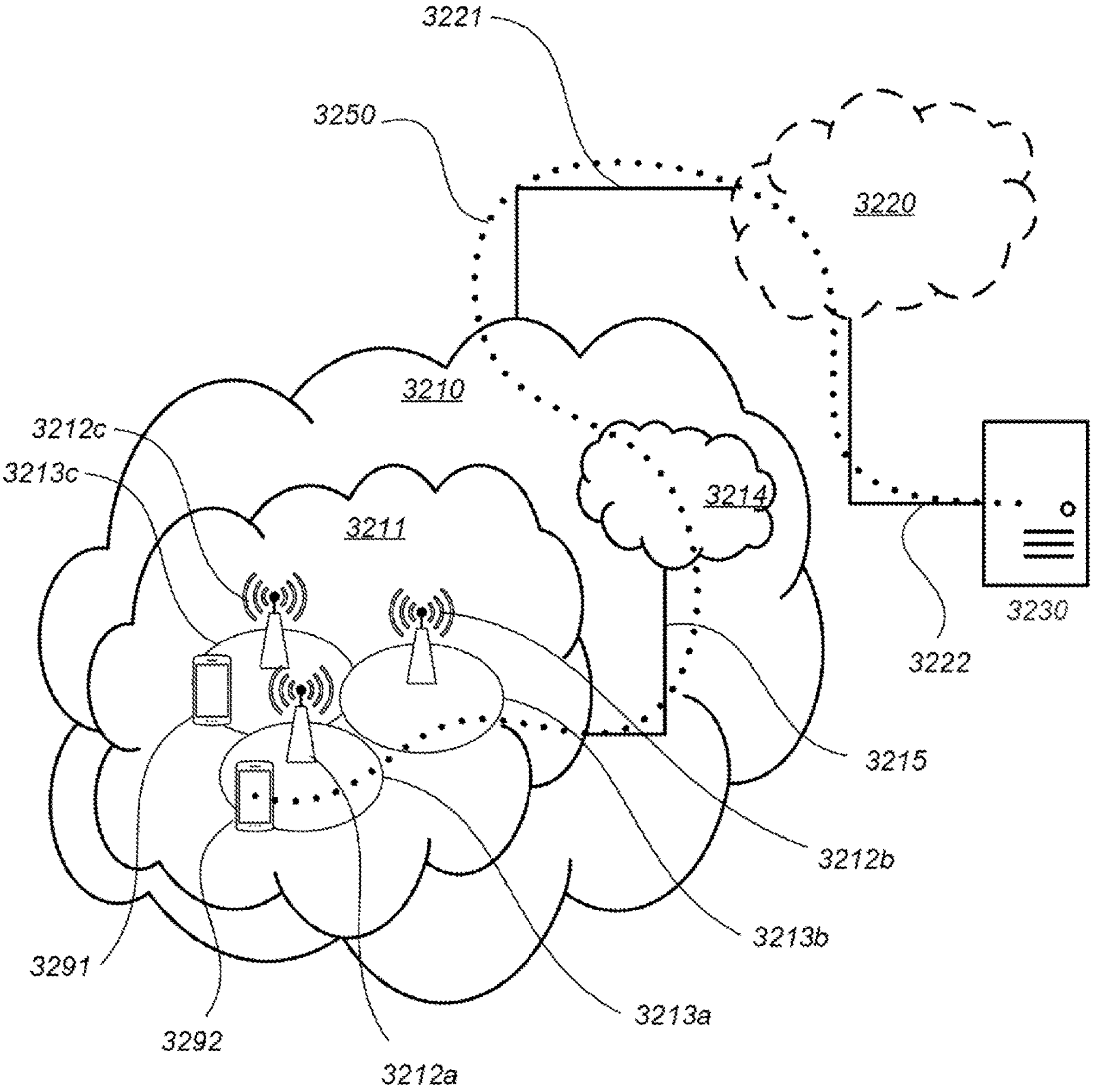
FIG. 10 schematically illustrates a telecommunication network connected via an intermediate network to a host computer.

With reference to FIG. 10, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212*a*, 3212*b*, 3212*c*, such e.g. the RAN node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 121, such as a Non-AP STA 3291 located in coverage area 3213*c* is configured to wirelessly connect to, or be paged by, the corresponding base station 3212*c*. A second UE 3292 e.g. the UE 120 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
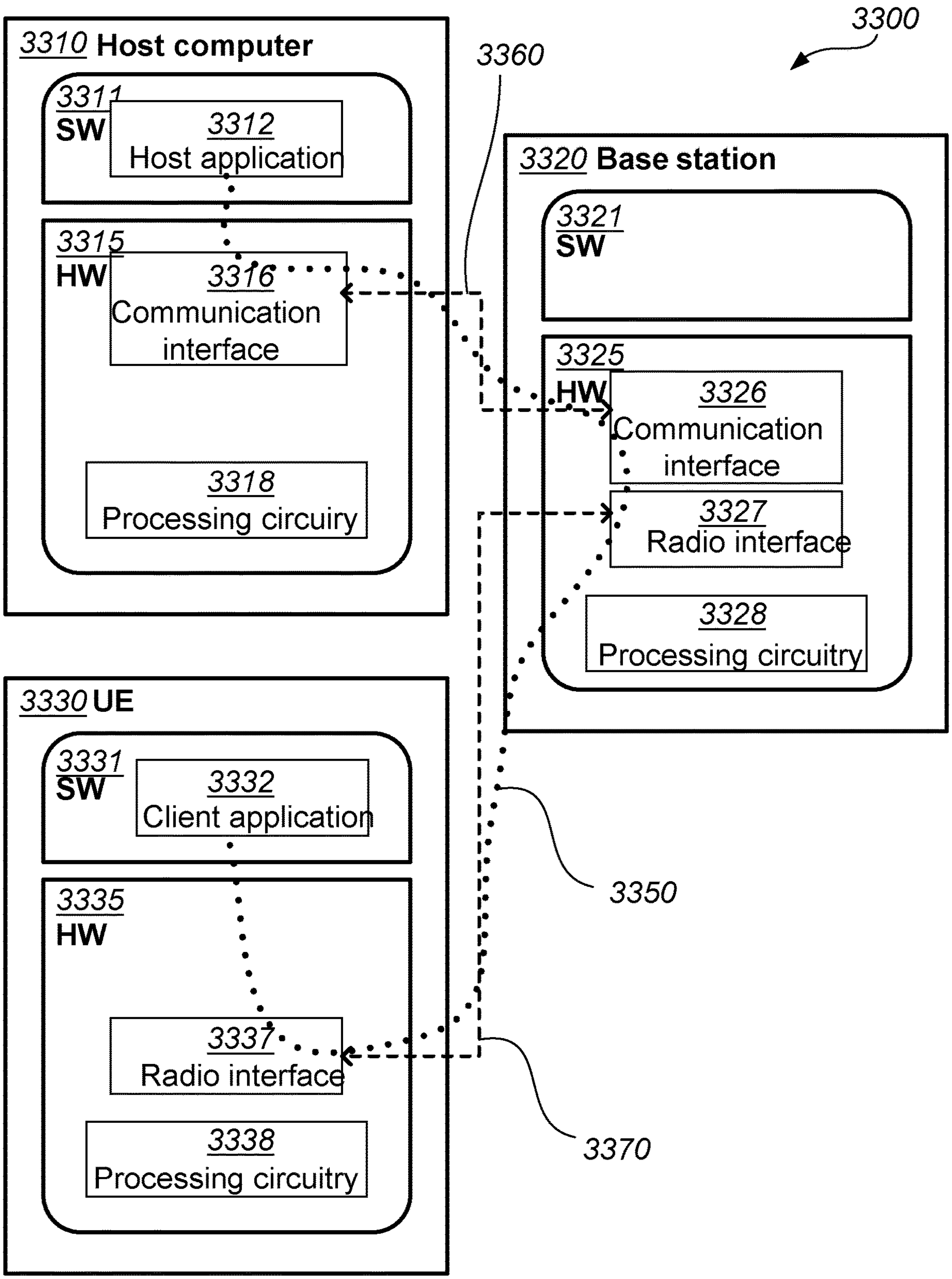
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212*a*, 3212*b*, 3212*c* and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
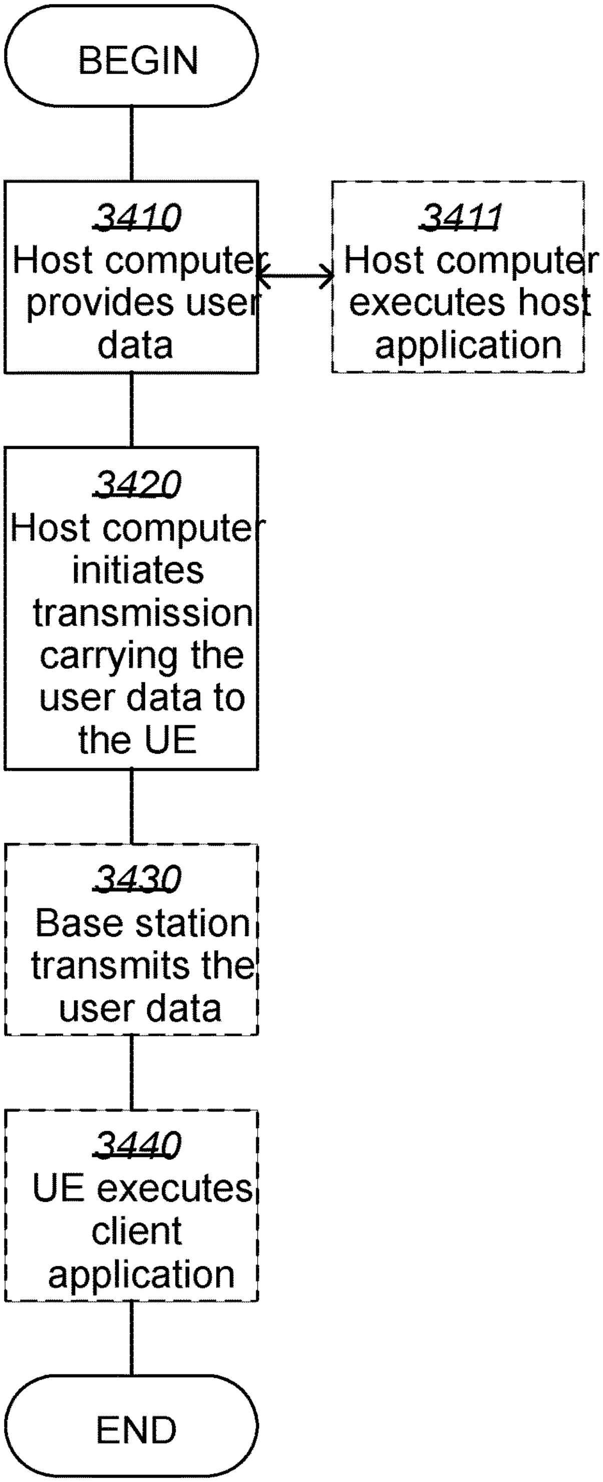
FIGS. 12-15 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station such as e.g. the RAN node 110, and a UE such as e.g., the UE 120 or UE 121, which may be those described with reference to FIG. 10 and FIG. 11. For simplicity of the present disclosure, only drawing references to FIG. 12 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

Figure 13:
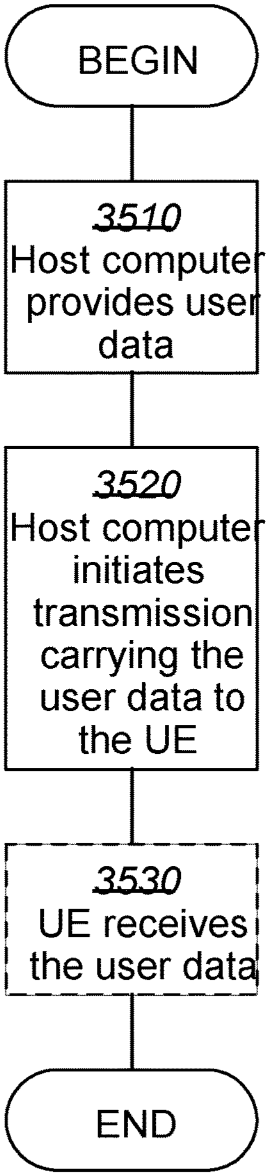

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 13 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 14:
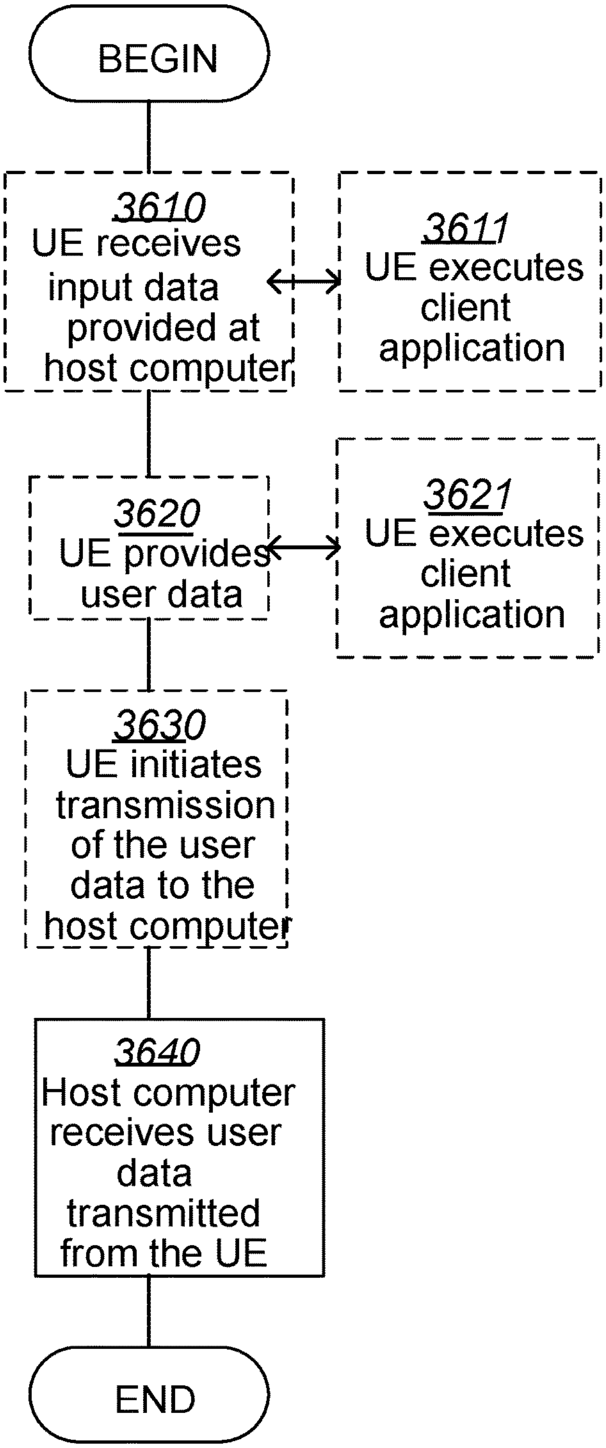

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 14 will be included in this section. In an optional first action 3610 of the method, the UE receives input data provided by the host computer. Additionally, or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 15:
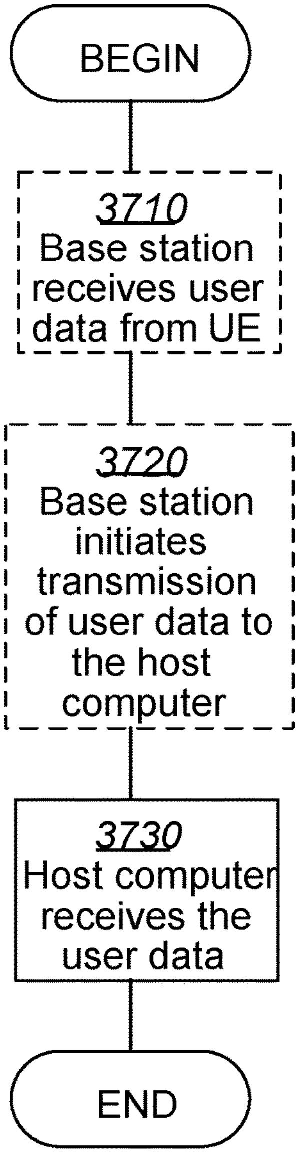

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 15 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

| Abbreviation | Explanation |
|---|---|
| LMF | Location Management Function |
| NRPPA | NR Positioning Protocol Annex |
| LPP | LTE Positioning Protocol |
| MBS | Multicast Broadcast Service |
| NR | NR Radio Access |
| RRC | Radio Resource Control |
| RSRP | Reference Signal received Power |
| QoS | Quality of Service |
| SDT | Small Data Transmission |
| V2X | Vehicle-to-Everything |

The invention claimed is:

1. A method performed by a User Equipment (UE) for handling an upcoming transmission of uplink data between the UE and a network node in a wireless communications network, the method comprising:

obtaining one or more criteria relating to a transmission of a positioning measurement result between that UE and the network node, wherein obtaining the one more criteria comprises receiving, from the network node, a Quality of Service (QoS) criteria related to reporting of the positioning measurement result;

obtaining characteristics of any one or more out of: the UE and the upcoming transmission of uplink data for the UE;

determining whether the UE shall use: (i) inactive mode based Small Data Transmission (SDT), or (ii) connected mode, for the upcoming transmission of uplink data, based on:

the QoS criteria, and the obtained characteristics of any one or more out of: the UE and the upcoming transmission of uplink data; and transmitting the positioning measurement result using the determined transmission mode.

2. The method of claim 1, wherein the QoS criteria relates to accuracy of the measurement result.

3. The method of claim 2, wherein the QoS criteria is a threshold indicating a required accuracy of the measurement result.

4. The method of claim 3, wherein determining a transmission mode for reporting the measurement result comprises determining, based on configured resources for SDT, whether the threshold can be met using SDT.

5. The method of claim 1, wherein the QoS criteria relates to latency of the measurement result.

6. The method of claim 5, by which the UE must provide the measurement result for required accuracy of the measurement result.

7. The method of claim 6, wherein determining a transmission mode for reporting the measurement result comprises determining, based on configured resources for SDT, whether the threshold can be met using SDT.

8. The method of claim 1, wherein the network node is a positioning node.

* * * * *